(12) United States Patent
Tomizawa et al.

(10) Patent No.: US 8,350,796 B2
(45) Date of Patent: Jan. 8, 2013

(54) DISPLAY DEVICE, LIQUID CRYSTAL MONITOR, LIQUID CRYSTAL TELEVISION RECEIVER, AND DISPLAY METHOD

(75) Inventors: Kazunari Tomizawa, Kizugawa (JP); Tomohiko Mori, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1218 days.

(21) Appl. No.: 11/884,344

(22) PCT Filed: Feb. 28, 2006

(86) PCT No.: PCT/JP2006/303783
§ 371 (c)(1),
(2), (4) Date: Aug. 15, 2007

(87) PCT Pub. No.: WO2006/093163
PCT Pub. Date: Sep. 8, 2006

(65) Prior Publication Data
US 2010/0149227 A1    Jun. 17, 2010

(30) Foreign Application Priority Data
Mar. 3, 2005   (JP) .................................. 2005-059700

(51) Int. Cl.
*G09G 3/36* (2006.01)
*G09G 5/10* (2006.01)

(52) U.S. Cl. .......................................... 345/96; 345/690

(58) Field of Classification Search .................... 345/50, 345/54, 89, 96, 98, 964, 690
See application file for complete search history.

(56) References Cited

U.S. PATENT DOCUMENTS

| | | | |
|---|---|---|---|
| 6,310,594 B1 * | 10/2001 | Libsch et al. ................... 345/90 |
| 6,958,791 B2 * | 10/2005 | Shimoshikiryo ............... 349/85 |
| 7,545,448 B2 * | 6/2009 | Wu ................................ 349/34 |
| 2002/0003520 A1 | 1/2002 | Aoki |
| 2002/0109659 A1 | 8/2002 | Hiroki |
| 2003/0146893 A1 | 8/2003 | Sawabe |
| 2003/0227429 A1 | 12/2003 | Shimoshikiryo |
| 2003/0234904 A1 * | 12/2003 | Matsuda et al. .............. 349/152 |
| 2004/0001167 A1 | 1/2004 | Takeuchi et al. |
| 2004/0061711 A1 | 4/2004 | Kurumisawa et al. |
| 2005/0035939 A1 * | 2/2005 | Akiyama ....................... 345/102 |
| 2005/0122441 A1 | 6/2005 | Shimoshikiryoh |

(Continued)

FOREIGN PATENT DOCUMENTS

JP         5-68221         3/1993

(Continued)

*Primary Examiner* — Quan-Zhen Wang
*Assistant Examiner* — Calvin C Ma
(74) *Attorney, Agent, or Firm* — Harness, Dickey & Pierce, P.L.C.

(57) ABSTRACT

A display device for displaying an image may include display and control sections. The display section, provided by a liquid crystal display (LCD), may be configured to display the image with a luminance in accordance with a display signal voltage, the display section including pixels, each pixel in the LCD including first and second subpixels connected to same source and gate lines.

The control section may be configured to divide each frame into first to m-th subframe periods, m being an integer greater than or equal to two, the control section configured to generate first to m-th display signals for the subframe periods for output to the display section such that dividing each frame into the subframe periods does not change a sum luminance output of the display section within each frame. The control section may create a difference between luminances of the first and second subpixels.

9 Claims, 23 Drawing Sheets

U.S. PATENT DOCUMENTS

| | | |
|---|---|---|
| 2005/0184944 A1 | 8/2005 | Miyata et al. |
| 2005/0195352 A1* | 9/2005 | Kubo et al. .................. 349/139 |
| 2006/0007091 A1 | 1/2006 | Yang et al. |

FOREIGN PATENT DOCUMENTS

| | | |
|---|---|---|
| JP | 07-294881 A | 11/1995 |
| JP | 2001-296841 | 10/2001 |
| JP | 2002-23707 | 1/2002 |
| JP | 2002-236472 A | 8/2002 |
| JP | 2003-295160 | 10/2003 |
| JP | 2004-21069 | 1/2004 |
| JP | 2004-62146 | 2/2004 |
| JP | 2004-78157 | 3/2004 |
| JP | 2004-85608 | 3/2004 |
| JP | 2004-233813 | 8/2004 |
| JP | 2004-258139 | 9/2004 |
| JP | 2004-325571 | 11/2004 |
| JP | 2005-189804 | 7/2005 |
| JP | 2005-234552 | 9/2005 |
| JP | 2006-11427 | 1/2006 |

* cited by examiner

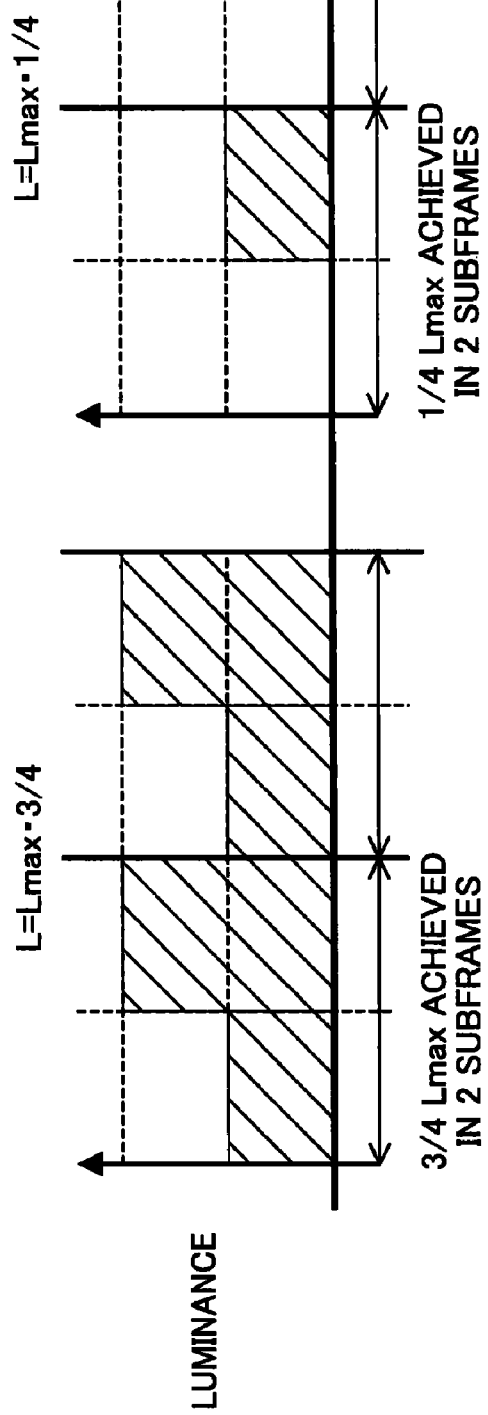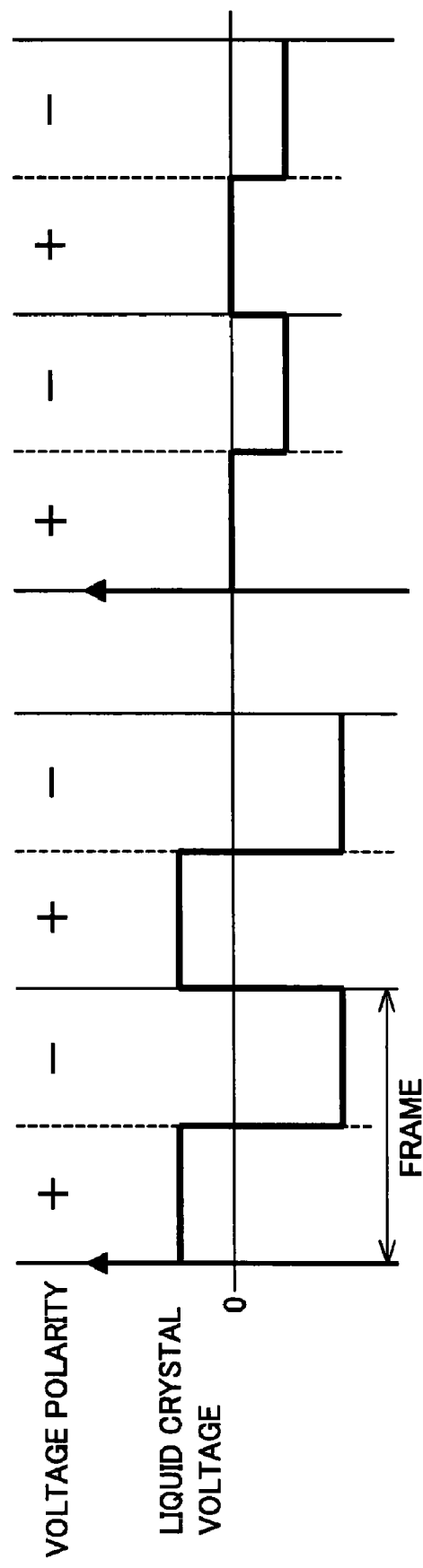
FIG. 12 (a)
FIG. 12 (b)

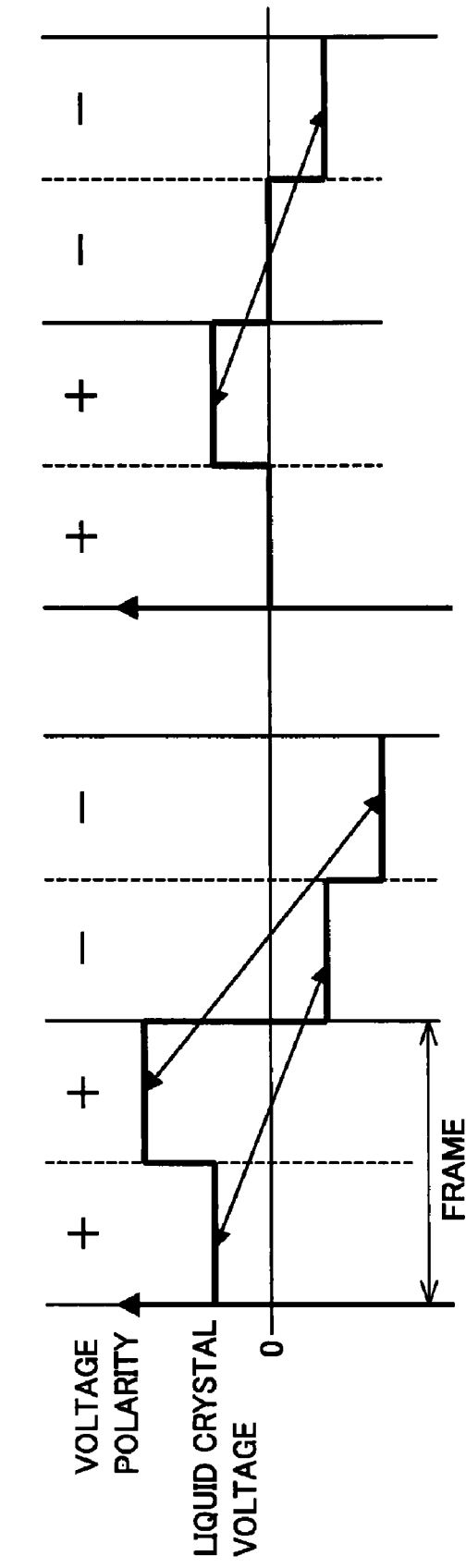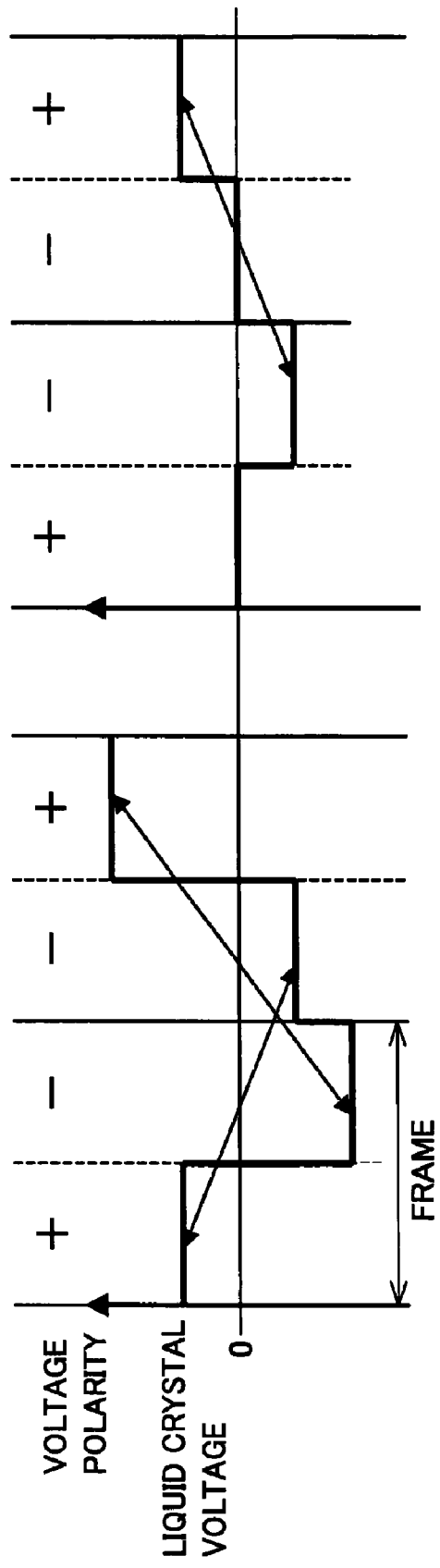
FIG. 13 (a)
FIG. 13 (b)

PRECEDING SUBFRAME

SUCCEEDING SUBFRAME

DISPLAY DEVICE, LIQUID CRYSTAL MONITOR, LIQUID CRYSTAL TELEVISION RECEIVER, AND DISPLAY METHOD

TECHNICAL FIELD

The present invention relates to display devices which display images by dividing each frame into a plurality of subframes.

BACKGROUND ART

An increasing number of liquid crystal displays, especially, color liquid crystal displays with a TN (Twisted Nematic) liquid crystal display panel (TN-mode liquid crystal panel, TN panel) are being used in recent years in what has been traditionally the fields for CRTs (cathode ray tubes).

For example, Patent Document 1 discloses a liquid crystal display switching between TN panel driving methods according to whether the display image is a moving image or a still image.

These TN panels have some problems associated with viewing angle characteristics when compared to CRTs.

Grayscale characteristics change with an increasing line-of-sight angle (angle at which the panel is viewed; angle between the normal to the panel and the direction in which the panel is viewed). At some angles, grayscale inversion may occur.

Techniques have been accordingly developed which improve viewing angle characteristics using an optical film and also which mitigate grayscale inversion by modifying a display method.

For example, Patent Documents 2 and 3 disclose a method whereby each frame is divided to write a signal to one pixel more than once and another in which signal write voltage levels are combined for improvement.

The viewing angle of TVs (television receivers) and other liquid crystal display panels which require wide viewing angles is increased by using liquid crystal of IPS (In-plane Switching) mode, VA (Vertical Alignment) mode, or like mode, instead of TN mode.

For example, a VA-mode liquid crystal panel (VA panel) shows a contrast of 10 or greater within 170° up/down/left/right and is free from grayscale inversion.

Patent Document 1: Japanese Unexamined Patent Publication (Tokukai) 2002-23707 (published Jan. 25, 2002)
Patent Document 2: Japanese Unexamined Patent Publication 5-68221/1993 (Tokukaihei 5-68221; published Mar. 19, 1993)
Patent Document 3: Japanese Unexamined Patent Publication (Tokukai) 2001-296841 (published Oct. 26, 2001)
Patent Document 4: Japanese Unexamined Patent Publication (Tokukai) 2004-78157 (published Mar. 11, 2004)
Patent Document 5: Japanese Unexamined Patent Publication (Tokukai) 2003-295160 (published Oct. 15, 2003)
Patent Document 6: Japanese Unexamined Patent Publication (Tokukai) 2004-62146 (published Feb. 26, 2004)
Patent Document 7: Japanese Unexamined Patent Publication (Tokukai) 2004-258139 (published Sep. 16, 2004)
Non-patent Document 1: New Handbook for Color Science, Second Edition (Tokyo University Press; published Jun. 10, 1998)

DISCLOSURE OF INVENTION

However, even VA panels, reputed to have a wide viewing angle, cannot completely prevent grayscale characteristics from changing with the viewing angle. Their grayscale characteristics deteriorate, for example, at large viewing angles in left and right directions.

Specifically, as shown in FIG. 2, grayscale γ-characteristics at 60° viewing angle differ from those when the panel is viewed from the front (that is, viewing angle=0°. That leads to an excess brightness phenomenon in which halftone luminance becomes excessively bright.

Liquid crystal panels of IPS mode have similar problems. Grayscale characteristics may change with an increasing viewing angle, albeit on a different scale, depending on the design of optical films and other optical properties.

The present invention, conceived to address these conventional problems, has an objective of providing a display device capable of mitigating the excess brightness phenomenon.

The display device of the present invention (present display device) is, to achieve the objective, is characterized as follows. The display device displays an image by dividing each frame into m subframes (m is an integer greater than or equal to 2), the display device including: a display section, provided by a liquid crystal display element, which displays an image with luminance in accordance with a display signal voltage; and a control section generating first to m-th display signals for the first to m-th subframes for output to the display section so that the dividing of the frames does not change a sum luminance output of the display section in each frame, wherein: the display section has pixels each containing a first subpixel and a second subpixel which are connected to the same source line and the same gate line; and the control section creates a difference between a luminance of the first subpixel and a luminance of the second subpixel and does not always maintain an invariable relationship between levels of the luminance of one of the subpixels and the luminance of the other subpixel, but changes the relationship.

The present display device displays an image on a display section with a display screen provided by a liquid crystal display element. The present display device is adapted so that the control section drives the display section by subframe display. Subframe display is a display scheme whereby each frame is divided into plural (m; m is an integer more than or equal to 2) subframes (first to m-th subframes).

In other words, the control section outputs a display signal to the display section m times per frame period (sequentially outputs the first to m-th display signals for the first to m-th subframes). Accordingly, the control section turns on all the gate lines of the display screen in the display section once per subframe period (m times per frame).

The control section preferably sets the output frequency (clock) of the display signal to m times that for ordinary hold display (m double clock). Ordinary hold display is an ordinary display scheme whereby no frame is divided into subframes (all the gate lines of the display screen are turned on only once per frame period).

The display section (display screen) is designed to display an image with luminance in accordance with a display signal voltage (voltage in accordance with a luminance grayscale level represented by a display signal) supplied from the control section. The control section is adapted to generate the first to m-th display signals (specify the display signal voltages) so as to prevent the dividing of the frames from leading to a change in the sum luminance (total luminance) output of the screen in each frame. The display signal voltage is a voltage applied to the liquid crystal in each pixel in the display section (liquid crystal driving voltage).

Generally, with the display screen in the display section, the discrepancy between the actual brightness and the expected brightness (brightness discrepancy) at large viewing angles can be sufficiently reduced as the display signal voltage (liquid crystal driving voltage) approaches a minimum or a maximum.

Brightness is a degree of brightness sensed by a human in accordance with the luminance of the image being displayed. See equations/inequalities (5), (6) in the embodiment (detailed later). If the sum luminance output over one frame is constant, the sum brightness output over one frame is also constant.

The expected brightness is the expected brightness output of the display screen (value in accordance with the liquid crystal driving voltage). The actual brightness is the actual brightness output of the screen and variable with viewing angle. Viewing the screen from the front, the actual brightness is equal to the expected brightness, producing no brightness discrepancy. On the other hand, as the viewing angle increases, the brightness discrepancy also grows.

Therefore, in the present display device, to display an image, the control section preferably changes the voltage of at least one of the first to m-th display signals so that the voltage approaches a minimum or a maximum. The control sufficiently reduces brightness discrepancy in at least one subframe. Accordingly, the present display device reduces brightness discrepancy and improves viewing angle characteristics over ordinary hold display, which in turn well mitigates excess brightness phenomena.

In the present display device, each one pixel in the display section includes two subpixels (first and second subpixels) connected to the same source line and the same gate line. The control section is designed to create a difference between the luminance of the first subpixel and the luminance of the second subpixel and designate one of the subpixels as a bright pixel (relatively high luminance pixel) and the other as a dark pixel (relatively low luminance pixel) when displaying halftone luminance (non-white, non-black luminance) (pixel divisional driving). In the present display device, the control section preferably sets the luminance of the subpixels so that the sum luminance output of the two subpixels agrees with the display signal.

In a case like this, the luminance of the two subpixels is closer to a maximum or a minimum than in a display scheme whereby the entire pixel contributes uniformly to the display. Therefore, the present display device exhibits further improved viewing angle characteristics.

For example, a low luminance image can be displayed by setting the luminance of one of the subpixels to black display and adjusting the luminance of the other subpixel. The scheme minimizes discrepancy between the actual brightness and the expected brightness in one of the subpixels. In a case like this, one of the subpixels preferably produces black display, but not necessarily so. That is, viewing angle characteristics are theoretically improved provided that the two subpixels is a combination of a bright pixel and a dark pixel (provided that the subpixels have a luminance difference).

As explained above, the present display device uses the pixel divisional driving and the subframe display together. Resultant synergistic effects impart extremely good viewing angle characteristics.

Following problems could occur with pixel divisional driving if the brightness of the brightness/darkness of the subpixels is maintained (if one of the subpixels continues to be a bright pixel, and the other subpixel to be a dark pixel).

In a case like this, the subpixels are always kept either bright or dark while displaying the same image. Therefore, a uniform color image display could be perceived by the user as a screened pattern of bright dots and dark dots (appears like a spotty image to the user).

Accordingly, in the present display device, when implementing pixel divisional driving, the control section is designed not to always maintain an invariable relationship between the levels of the luminance of one of the subpixels and the luminance of the other subpixel, but changes the relationship. In other words, the present display device is adapted to reverse the relationship between the levels of the luminance of one of the subpixels and the luminance of the other subpixel either periodically or at random. Therefore, the present display device does not fix bright (or dark) dots when displaying a uniform color image. Thus, the scheme reduces the spotty appearance.

In the present display device, the control section preferably sets the luminance of the subpixels so that the sum luminance output of the two subpixels agrees with the display signal.

The structure for implementing the pixel divisional driving may be designed as follows. First, each subpixel is connected to a different auxiliary line and includes a pixel capacitance, a switching element, and an auxiliary capacitance, the switching element applying, to the pixel capacitance, a display signal applied to the source line when the gate line goes ON, the auxiliary capacitance being connected to the pixel capacitance and the auxiliary line.

In the structure, the state of the auxiliary signal and the polarity of the display signal of the voltage (liquid crystal driving voltage) are adjusted to drive the subpixel for brightness/darkness. In other words, in an ordinary display device, parasitic capacitance causes drawing phenomena when the gate line goes OFF. As the auxiliary signal supplied to the subpixel through the auxiliary line falls (changes from HIGH to LOW), the liquid crystal driving voltage falls by a predetermined value. As the auxiliary signal rises (changes from LOW to HIGH), the liquid crystal driving voltage rises by a predetermined value.

Therefore, if the liquid crystal driving voltage is positive, the luminance of the subpixel is increased by turning on the auxiliary signal supplied to the subpixel immediately after the drawing phenomena. On the other hand, if the liquid crystal driving voltage is negative, the luminance of the subpixel is decreased by turning off the auxiliary signal supplied to the subpixel immediately after the drawing phenomena.

Thus, the control section changes, for each subpixel, the state of the auxiliary signal supplied to the subpixel (whether the waveform is HIGH or LOW immediately after the drawing phenomena) and adjusts the polarity of the display signal voltage to control the relationship between the levels of the luminances of the subpixels.

In ordinary hold display, the liquid crystal driving voltage is preferably an AC voltage under the control of the control section, because that enables switching of the polarity of the pixel charge (polarity of the voltage across the pixel electrodes sandwiching the liquid crystal) for each frame.

Should the voltage was a DC voltage, there would occur a biased voltage across the electrodes, and the pixel electrodes could accumulate electric charge. If the condition continued, potential difference would persist between the electrodes (generally called an etching or burn-in phenomenon) even in the absence of voltage application.

In the subframe display as in the present display device, the value (absolute value) of the liquid crystal driving voltage applied across the pixel electrodes are in many cases different from one subframe to the next.

Therefore, if the polarity of the liquid crystal driving voltage is reversed at the subframe cycle as in the case with an ordinary driving scheme, the applied liquid crystal driving voltage is biased due to the subframe-to-subframe difference of the voltage value. If the liquid crystal panel is driven for an extended period of time under these conditions, electric charge accumulates between the electrodes, possibly causing the etching or flickering mentioned above. Therefore, in the present display device, the polarity of the liquid crystal driving voltage is preferably reversed at the frame cycle.

This polarity reversion scheme is effective when each frame is divided into m subframes (m subfields) and also when each frame is divided into two subframes (two subfields) at a division ratio of 1:n or n:1.

For example, when producing a display with two subframes, There are two approaches to the reversing of the polarity of the liquid crystal driving voltage at the frame cycle. One of them is to maintain the polarity of the liquid crystal driving voltage throughout the first and second subframes (apply voltage of the same polarity to the liquid crystal throughout a frame) and to reverse the polarity between adjacent frames.

The other approach, when producing a display with two subframes, is to reverse the polarity of the liquid crystal driving voltage between the two subframes in each frame and maintain the polarity over the first subframe of each one frame and the second subframe, of another frame, adjacent to the first subframe. The driving with an AC liquid crystal driving voltage at the frame cycle cancels the total voltage across the pixel electrodes in each two frames even if the liquid crystal driving voltage differs greatly between the subframes. Therefore, etching, burn-in, and flickering are prevented.

In the present display device, when the liquid crystal driving voltage is reversed at the frame cycle, the control section preferably inverts the state of the auxiliary signal supplied to each subpixel. The control prevents fixing the brightness/darkness of the subpixels.

When the liquid crystal driving voltage is reversed at the frame cycle and each frame is divided into an even number of subframes (m defined earlier is an even number), the control section may reverse the state of the auxiliary signal supplied to each subpixel at the subframe cycle. The reversion enables changing the brightness/darkness of the subpixels at the frame cycle.

When there are produced an odd number of subframes (each frame is divided into an odd number of subframes), the total liquid crystal driving voltage over two frames can be rendered 0 V even if the polarity of the voltage is reversed for each subframe.

Therefore, in this case, the control section may reverse the polarity of the liquid crystal driving voltage either at the frame cycle or at the subframe cycle. Reversing the polarity at either of the cycles, the control section preferably inverts the state of the auxiliary signal supplied to each subpixel from one subframe to the next in each frame and maintain the state over the last subframe of each frame and the first subframe of the immediately following frame. The inversion enables changing the brightness/darkness of the subpixels at the frame cycle.

Following problems could occur with the scheme whereby the brightness/darkness of the subpixels is changed at the frame cycle. If the frame frequency is set to 60 Hz, the luminance of the subpixels changes at a frequency of 30 Hz. Thus, the scheme may possibly entail flickering.

With schemes whereby each frame is divided into three or more subframes (m defined earlier is 3 or greater), however, these flickers are reduced by reversing the relationship specified between the levels of the luminances of the subpixels in each frame. In a case like this, the frame-to-frame luminance difference of each subpixel is reduced. Thus, less flickers occur.

A combination of the present display device and an image signal feeder section (signal feeder section) provides a liquid crystal monitor for personal computers and other uses.

The image signal feeder section for transferring externally supplied image signals to the control section. In the structure, the control section in the present display device generates the display signals from the image signals fed from the image signal feeder section, for output to the display section.

A combination of the present display device and a tuner section provides a liquid crystal television receiver. The tuner section is for the reception of television broadcast signals.

The method of displaying an image of the present invention (present display method) is characterized as follows. The method displays an image by dividing each frame into m subframes (m is an integer greater than or equal to 2), the display method involving the step of generating first to m-th display signals for the first to m-th subframes for output to a display section provided by a liquid crystal display element so that the dividing of the frames does not change a sum luminance output of the display section in each frame, wherein: the display section has pixels each containing a first subpixel and a second subpixel which are connected to the same source line and the same gate line; and the output step creates a difference between a luminance of the first subpixel and a luminance of the second subpixel and does not always maintain an invariable relationship between levels of the luminance of one of the subpixels and the luminance of the other subpixel, but changes the relationship.

The present display method is a method used in the present display device. Therefore, these display methods better reduce discrepancy in each frame and mitigate excess brightness phenomena caused by the discrepancy than ordinary hold display methods. The methods reduce the spotty appearance felt by the user.

As described in the foregoing, the display device of the present invention (present display device) displays an image by dividing each frame into m subframes (m is an integer greater than or equal to 2) and includes a display section and a control section. The display section is provided by a liquid crystal display element and displays an image with luminance in accordance with a display signal voltage. The control section generates first to m-th display signals for the first to m-th subframes for output to the display section so that the dividing of the frames does not change a sum luminance output of the display section in each frame. The display section has pixels each containing a first subpixel and a second subpixel which are connected to the same source line and the same gate line. The control section creates a difference between a luminance of the first subpixel and a luminance of the second subpixel and does not always maintain an invariable relationship between levels of the luminance of one of the subpixels and the luminance of the other subpixel, but changes the relationship.

The present display device uses the subframe display and the pixel divisional driving together. Resultant synergistic effects impart extremely good viewing angle characteristics.

In the present display device, the control section is designed to, when implementing the pixel divisional driving, not always maintain an invariable relationship between the levels of the luminance of one of the subpixels and the luminance of the other subpixel, but changes the relationship. In other words, the present display device is adapted to reverse the relationship between the levels of the luminance of one of the subpixels and the luminance of the other subpixel either periodically or at random. Therefore, the present display device does not fix bright (or dark) dots when displaying a uniform color image. Thus, the scheme reduces the spotty appearance felt by the user.

Additional objects, advantages and novel features of the invention will be set forth in part in the description which follows, and in part will become apparent to those skilled in the art upon examination of the following or may be learned by practice of the invention.

BRIEF DESCRIPTION OF DRAWINGS

FIG. 12(a) A graph representing the luminance in a preceding subframe and a succeeding subframe for a display luminance three quarters of Lmax and a display luminance a quarter of Lmax.

FIG. 12(b) A graph representing transitioning of a liquid crystal driving voltage (that is, voltage applied to liquid crystal) of which the polarity is reversed at a subframe cycle.

FIG. 13(a) An illustration of a method whereby the polarity of an electrode-to-electrode voltage is reversed at a frame cycle.

FIG. 13(b) An illustration of a method whereby the polarity of an electrode-to-electrode voltage is reversed at a frame cycle.

BEST MODE FOR CARRYING OUT INVENTION

Embodiment 1

The following will describe an embodiment of the present invention.

A liquid crystal display of the present embodiment (present display device) has a liquid crystal panel of vertical alignment (VA) mode divided into a plurality of domains. The present display device functions as a liquid crystal monitor producing a display on a liquid crystal panel from externally supplied image signals.

Figure 1:
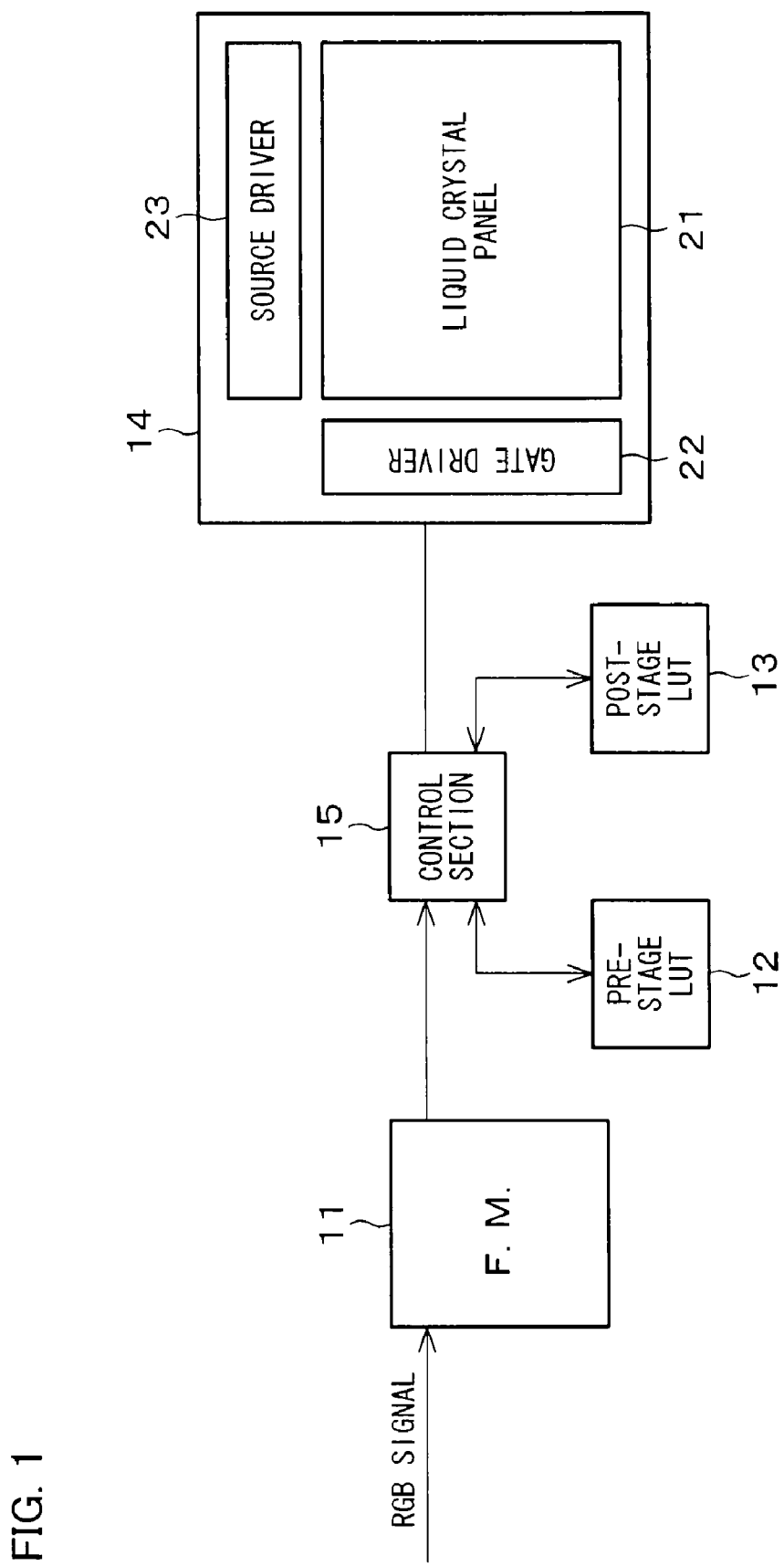
FIG. 1 A block diagram illustrating the structure of a display device in accordance with an embodiment of the present invention.

FIG. 1 is a block diagram illustrating the internal structure of the present display device. As shown in the figure, the present display device includes a frame memory (F.M.) 11, a pre-stage LUT 12, a post-stage LUT 13, a display section 14, and a control section 15.

The frame memory (image signal feeder section) 11 stores a frame of image signals (RGB signals) fed from an external signal source. The pre-stage LUT (look-up table) 12 and the post-stage LUT 13 is an association table (conversion table) between external image signal inputs and display signal outputs to the display section 14.

The present display device is adapted to carry out subframe display. Subframe display is a method of producing a display by dividing each frame into a plurality of subframes.

In other words, the present display device is designed to produce a display from a frame of image signals fed in one frame period, by means of two subframes of the same size (period) at double the frequency.

The pre-stage LUT 12 is an association table for display signal outputs made in a pre-stage subframe (preceding subframe or second subframe). That display signal may be referred to as the pre-stage display signal or the second display signal. The post-stage LUT 13 is an association table for display signal outputs made in a post-stage subframe (succeeding subframe or first subframe). That display signal may be referred to as the post-stage display signal or the first display signal.

The display section 14 includes a liquid crystal panel 21, a gate driver 22, and a source driver 23 as shown in FIG. 1. The display section 14 produces an image display from incoming display signals. The liquid crystal panel 21 is an active matrix (TFT) liquid crystal panel of VA mode.

The control section 15 is a central processing unit of the present display device, controlling all operations in the present display device. The control section 15 generates display signals from the image signals stored in the frame memory 11 using the pre-stage LUT 12 and the post-stage LUT 13 and supplies the signals to the display section 14.

In other words, the control section 15 records the image signals that are incoming at an ordinary output frequency (ordinary clock; for example, 25 MHz) into the frame memory 11. The control section 15 then outputs twice the image signals from the frame memory 11 in accordance with a clock with double the frequency of the ordinary clock (double clock; 50 MHz).

The control section 15 generates pre-stage display signals from first image signal outputs using the pre-stage LUT 12. Thereafter, the control section 15 generates post-stage display signals from second image signal outputs using the post-stage LUT 13. The display signals are fed to the display section 14 in a sequential manner in accordance with the double clock.

Accordingly, the display section 14 displays, once in every frame period, different images from the two sequentially fed display signals (all the gate lines of the liquid crystal panel 21 are turned on once in each of the two subframe periods).

Display signal output operation will be described later in more detail.

Next will be described the generation of the pre-stage display signals and the post-stage display signals by the control section 15. First, the following will describe typical display luminance (luminance of an image display produced on a panel) in relation with the liquid crystal panel.

When an image is displayed from ordinary 8-bit data over a single frame, without using subframes (ordinary hold display in which all the gate lines of the liquid crystal panel are turned on only once in every frame period), a display signal represents luminance grayscale levels (signal grayscale levels) 0 to 255.

The signal grayscale levels and the display luminance of a liquid crystal panel are related approximately by equation 1 below:

$$((T-T0)/(T\max-T0))=(L/L\max)^\gamma \quad (1)$$

where L is a signal grayscale level in ordinary hold display in which an image is displayed over a frame (frame grayscale level), Lmax is a maximum luminance grayscale level (=255), T is a display luminance, Tmax is a maximum luminance (luminance when L=Lmax=255; white), T0 is a minimum luminance (luminance when L=0; black), and γ is a correction value (typically, 2.2).

In the case of an actual liquid crystal panel 21, T0≠0. Let us assume in the following, however, that T0=0 for simple description.

Figure 2:
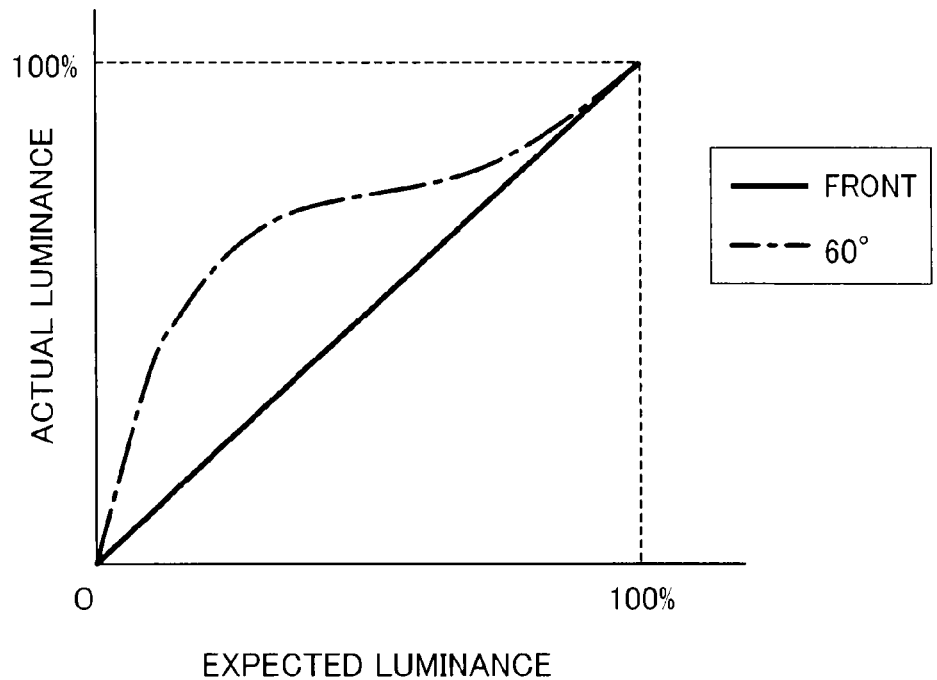
FIG. 2 A graph representing display luminance outputs of a liquid crystal panel (relationship between expected luminance and actual luminance) for ordinary hold display.

The display luminance T output of the liquid crystal panel 21 in the above case (ordinary hold display) is drawn in the graph in FIG. 2. In the graph, the expected luminance output (expected luminance; value in accordance with a signal grayscale level, equivalent to the display luminance T) is plotted on the horizontal axis. The actual luminance output (actual luminance) is plotted on the vertical axis.

As can be seen from the graph, in this case, the two luminances are equal to each other when the liquid crystal panel 21 is viewed from the front (that is, viewing angle=0°). In contrast, when the viewing angle is set to 60°, the actual luminance increases at halftone luminance due to changes in grayscale γ-characteristics.

Next, the display luminance of the present display device will be described.

In the present display device, the control section 15 is designed to with such grayscale display capability that it can satisfy conditions (a) and (b):
(a) The total sum of the luminances (display luminances) of the images displayed by the display section 14 in the individual preceding and succeeding subframes (integral luminance over one frame) equals the display luminance over one frame in ordinary hold display; and
(b) One of the subframes is either black (minimum luminance) or white (maximum luminance).

To achieve this, the present display device is designed so that the control section 15 can equally divide a frame into two subframes in one of which the display luminance reaches half a maximum luminance.

In other words, in a case where the luminance reaches half the maximum luminance (threshold luminance; Tmax/2) in one frame (in a low luminance case), the control section 15 designates the preceding subframe for a minimum luminance (black) and adjusts the display luminance in only the succeeding subframe (using only the succeeding subframe) to achieve a grayscale display. In a case like this, the integral luminance over one frame equals (minimum luminance+luminance in the succeeding subframe)/2.

In a case of outputting a higher luminance than the threshold luminance (in a high luminance case), the control section 15 designates the succeeding subframe for a maximum luminance (white) and adjusts the display luminance in the preceding subframe to achieve a grayscale display. In a case like this, the integral luminance over one frame equals (luminance in the preceding subframe+maximum luminance)/2.

Now, the following will specifically describe such signal grayscale level settings for the display signals (pre-stage display signal and post-stage display signal) that this particular display luminance is achieved. The signal grayscale level settings are made by the control section 15 shown in FIG. 1. The control section 15 calculates in advance a frame grayscale level corresponding to the threshold luminance (Tmax/2) by equation 1.

In other words, rearranging equation 1, the frame grayscale level (threshold luminance grayscale level; Lt) which is in accordance with the display luminance is given by:

$$Lt=0.5^{(1/\gamma)} \times L\max \quad (2)$$

$$\text{where } L\max=T\max^\gamma \quad (2a)$$

When displaying an image, the control section 15 calculates the frame grayscale level L from the image signal output of the frame memory 11. If L≦Lt, the control section controls the pre-stage LUT 12 to set the luminance grayscale level represented by the pre-stage display signal (termed F) to a minimum (0).

Meanwhile, the control section 15 controls the post-stage LUT 13 to set the luminance grayscale level represented by the post-stage display signal (termed R) by equation 1 so that $$R=0.5^{(1/\gamma)} \times L \quad (3)$$

If the frame grayscale level L>Lt, the control section 15 sets the luminance grayscale level represented by the post-stage display signal R to a maximum (255). Meanwhile, the control section 15, using equation 1, sets the luminance in the preceding subframe grayscale level F to:

$$F=(L^\gamma-0.5 \times L\max^\gamma)^{(1/\gamma)} \quad (4)$$

Next, display signal output operation by the present display device will be described in more detail. In the following, the liquid crystal panel 21 is assumed to have a×b pixels. In a case like this, the control section 15 stores in the source driver 23 the pre-stage display signals for the a pixels on the first gate lines in accordance with the double clock.

The control section 15 controls the gate driver 22 to turn on the first gate lines to write a pre-stage display signal to the pixels on the gate lines. Thereafter, The control section 15 similarly turns on the second to b-th gate lines in accordance with the double clock, while changing the pre-stage display signals to be stored in the source driver 23. Accordingly, the pre-stage display signals for all the pixels can be written within half the frame period (½ frame period).

Furthermore, the control section 15 performs a similar operation to write a post-stage display signal to the pixels on all the gate lines within the remaining half of the frame period. Accordingly, a pre-stage display signal and a post-stage display signal are written to each pixel taking up equal times (=½ frame period).

Figure 3:
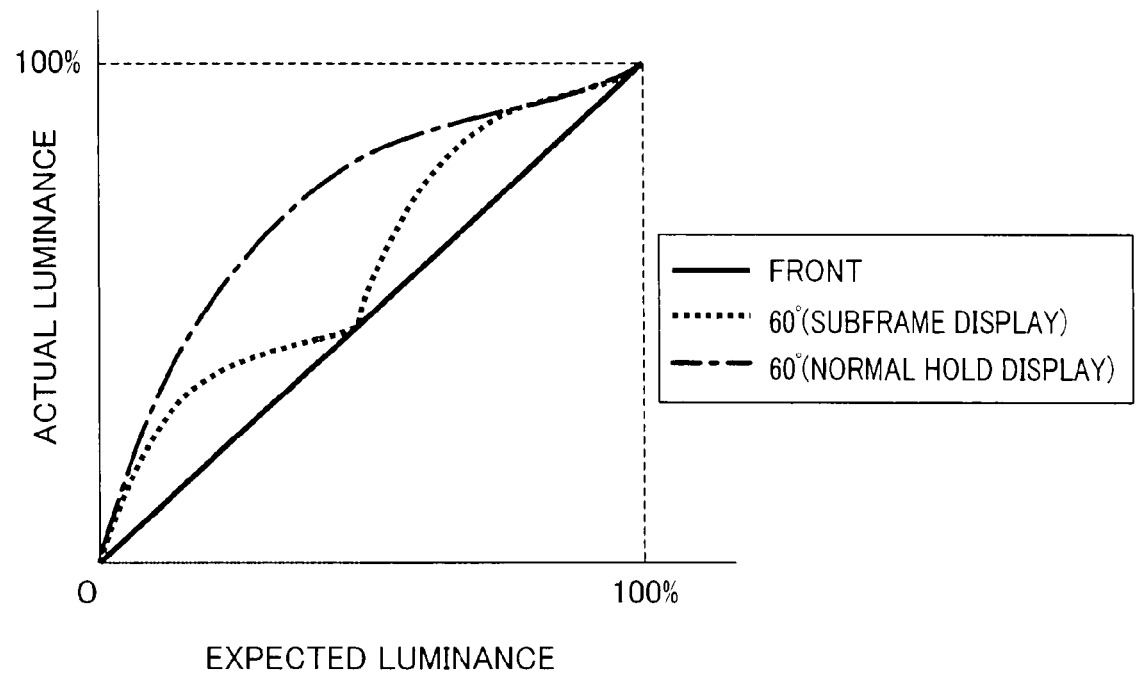
FIG. 3 A graph representing display luminance outputs of a liquid crystal panel (relationship between expected luminance and actual luminance) for subframe display on the display device shown in FIG. 1.

FIG. 3 is a graph representing results of such subframe display (broken line and solid line) in which the pre-stage display signal outputs and the post-stage display signal outputs are divided between the preceding and succeeding subframes, together with the results (dash-dot line and solid line) shown in FIG. 2.

The present display device uses a liquid crystal panel 21 in which, as shown in FIG. 2, the discrepancy of the actual luminance from the expected luminance (equivalent to the solid line) at large viewing angles is a minimum (0) when the display luminance is either a minimum or a maximum and a maximum at halftones (threshold luminance proximity).

The present display device performs subframe display in which each frame is divided into subframes. Furthermore, the two subframes are set up to have equal durations. At low luminances, only the succeeding subframe is used to produce a display, with the preceding subframe being designated for black display, so long as the integral luminance over one frame does not change. Therefore, the discrepancy in the preceding subframe is reduced to a minimum. Thus, the total discrepancy in the two subframes can be reduced to about half as indicated by the broken line in FIG. 3.

On the other hand, at high luminances, the luminance in only the preceding subframe is adjusted to produce a display, with the succeeding subframe being designated for white display, so long as the integral luminance over one frame does not change. Therefore, the discrepancy in the succeeding subframe is reduced similarly to a minimum in this case. The total discrepancy in the two subframes can be reduced to about half as indicated by the broken line in FIG. 3.

As explained above, the present display device is capable of reducing overall discrepancy to about half that for structures for ordinary hold display (structures in which an image is displayed over a single frame, without using subframes). That reduces brightness/excess brightness in halftone images (excess brightness phenomenon) shown in FIG. 2.

In the present embodiment, the duration of the preceding subframe is made equal to that of the succeeding subframe. This is for the purpose of achieving half the maximum luminance in one subframe. The subframe durations, however, may be set to different values.

The excess brightness phenomenon, an issue to be addressed by the present display device, is a phenomenon in which a halftone luminance image appears excessively bright because of the characteristics of the actual luminance at large viewing angles as shown in FIG. 2.

Normally, an image captured on a camera is represented by luminance signals. To transmit the image in digital format, the image is converted to display signals using γ shown in equation 1 (in other words, luminance signals are raised to the (1/γ)-th power and equally divided to assign grayscale levels). The image displayed on a liquid crystal panel or like display device from these display signals has the display luminance given by equation 1.

The human eye perceives an image by brightness, not by luminance. Brightness (brightness index) M is given by equations/inequalities (5), (6) (see Non-patent Document 1):

$$M = 116 \times Y^{(1/3)} - 16, Y > 0.008856 \quad (5)$$

$$M = 903.29 \times Y, Y \leq 0.008856 \quad (6)$$

where Y is equivalent to the actual luminance explained above and given by Y=(y/yn), y denotes the y value of tristimulus values of a given color in the xyz color system, and yn denotes the y value by standard light on a total diffusing reflective face and is defined as yn=100.

The equations/inequalities indicate that the human eye tends to be sensitive to low luminance video and insensitive to high luminance video. A human being presumably perceives excess brightness as discrepancy in brightness, not discrepancy in luminance.

Figure 6:
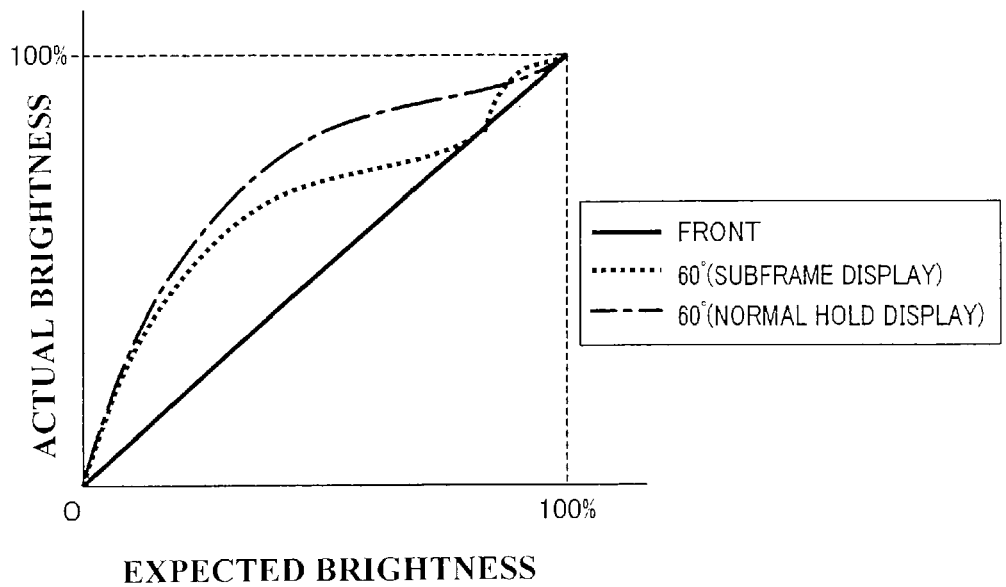
FIG. 6 A brightness graph plotted by luminance-to-brightness conversion of the luminance graph in FIG. 3.

FIG. 6 is a graph plotted by luminance-to-brightness conversion of the luminance graph in FIG. 3. In the graph, the expected brightness output (expected brightness; a value in accordance with a signal grayscale level, equivalent to the brightness M) is plotted on the horizontal axis. The actual brightness output (actual brightness) is plotted on the vertical axis. As indicated by the solid line in the graph, the two levels of brightness are equal to each other when the liquid crystal panel 21 is viewed from the front (that is, viewing angle=0°.

In contrast, as indicated by the broken line in the graph, when the viewing angle is set to 60° and the durations of all the subframes are equal (in other words, when half the maximum luminance is reached within one subframe), the discrepancy of the actual brightness from the expected brightness is improved, albeit not much, over conventional cases of ordinary hold display. That demonstrates that the excess brightness phenomenon is somewhat mitigated.

For further mitigating the excess brightness phenomenon in a manner that suits human vision, it is more preferable to determine frame division ratios in accordance with brightness, not with luminance. The discrepancy of the actual brightness from the expected brightness is a maximum when the expected brightness is half the maximum value similarly to the case of luminance.

Therefore, the discrepancy as perceived by the human eye (that is, excess brightness) is reduced better by dividing a frame so that half the maximum brightness is reached within one subframe than by dividing a frame so that half the maximum luminance is reached within one subframe.

Accordingly, the following will describe desirable values at frame dividing points. First, for ease in calculation, equations/inequalities (5), (6) introduced above are approximated by equation (6a) which is derived by combining and rearranging (5), (6). Equation (6a) has a similar form to equation 1.

$$M = Y^{(1/\alpha)} \quad (6a)$$

In this form of the equation, a 2.5.

The luminance Y and brightness M as given in equation (6a) has a proper relationship (suitable to human vision) if α is from 2.2 to 3.0.

It is known that the durations of the two subframes is preferably about 1:3 if γ=2.2 and about 1:7 if γ=3.0 to produce a display at half the maximum brightness M in one subframe. When the frame is divided as in above, one of the subframes which is used for display when luminance is low (the one maintained at a maximum luminance in a high luminance case) is the shorter period.

The following will describe a case where the ratio of the preceding subframe and the succeeding subframe is set to 3:1. First, display luminance in the case will be described.

In this case, to produce a low luminance display in which a quarter of a maximum luminance (threshold luminance; Tmax/4) is achieved in one frame, the control section 15 designates the preceding subframe for a minimum luminance (black) and adjusts the display luminance in only the succeeding subframe to produce a grayscale display (uses only the succeeding subframe to produce a grayscale display). The integral luminance over one frame here equals (minimum luminance+luminance in the succeeding subframe)/4.

To achieve a higher luminance than the threshold luminance (Tmax/4) in one frame (in a high luminance case), the control section 15 designates the succeeding subframe for a maximum luminance (white) and adjusts the display luminance in the preceding subframe to produce a grayscale display. The integral luminance over one frame here equals (luminance in the preceding subframe+maximum luminance)/4.

Now, the following will specifically describe such signal grayscale level settings for the display signals (pre-stage display signal and post-stage display signal) that this particular display luminance is achieved. The signal grayscale levels (and output operation which will be detailed later) in this case are also set so as to meet conditions (a), (b).

First, the control section 15 calculates in advance a frame grayscale level corresponding to the threshold luminance (Tmax/4) by equation 1.

In other words, rearranging equation 1, the frame grayscale level (threshold luminance grayscale level; Lt) which is in accordance with the display luminance is given by:

$$Lt=(1/4)^{\wedge}(1/\gamma) \times Lmax \qquad (7)$$

When displaying an image, the control section 15 calculates the frame grayscale level L from the image signal output of the frame memory 11.

If L≦Lt, the control section 15 controls the pre-stage LUT 12 to set the luminance grayscale level represented by the pre-stage display signal (termed F) to a minimum (0).

Meanwhile, the control section 15 controls the post-stage LUT 13 to set the luminance grayscale level represented by the post-stage display signal (termed R) by equation 1 so that $$R=(1/4)^{\wedge}(1/\gamma) \times L \qquad (8)$$

If the frame grayscale level L>Lt, the control section 15 sets the luminance grayscale level represented by the post-stage display signal R to a maximum (255).

Meanwhile, the control section 15, using equation 1, sets the luminance in the preceding subframe grayscale level F to:

$$F=((L^{\wedge}\gamma-(1/4) \times Lmax^{\wedge}\gamma))^{\wedge}(1/\gamma) \qquad (9)$$

Next, the output operation for the pre-stage display signal and the post-stage display signal will be described. As explained above, in an equal frame division structure, a pre-stage display signal and a post-stage display signal are written to each pixel over equal durations (½ frame period). This is because in order to write the post-stage display signals after all the pre-stage display signals are written in accordance with the double clock, those gate lines which are related to the display signals are turned on for equal periods.

Therefore, the division ratios can be changed by changing the timings at which to start writing the post-stage display signals (gate ON timings related to the post-stage display signals).

Figure 4:
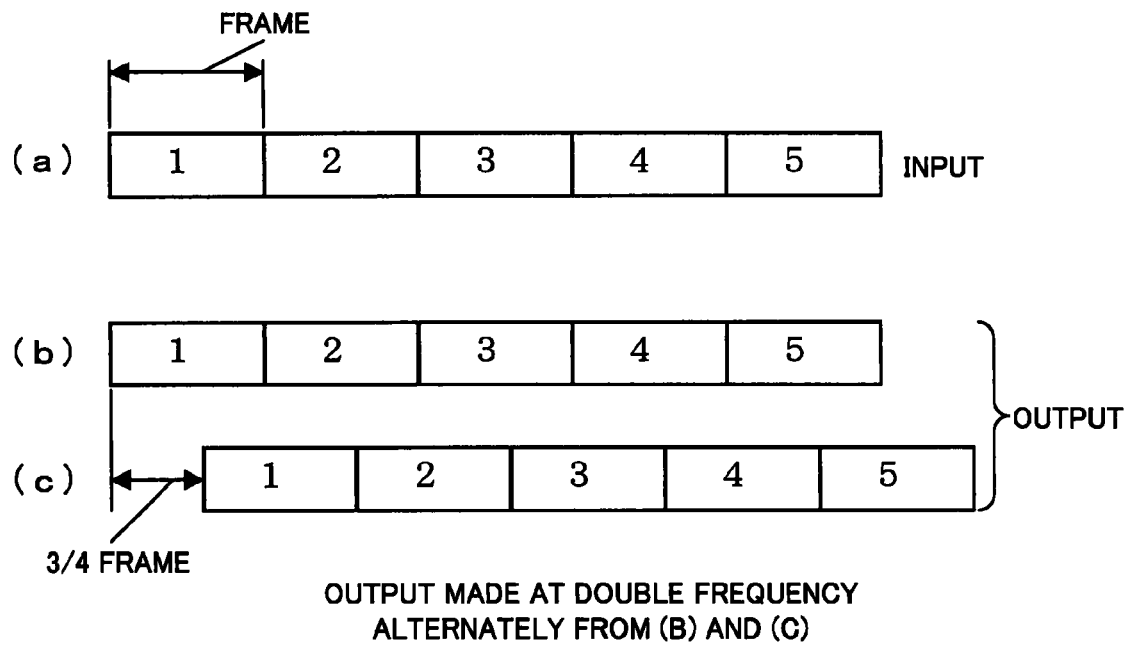
FIG. 4 (a) is an illustration of an image signal fed to a frame memory in the display device shown in FIG. 1. (b) is an illustration of an image signal output from the frame memory to a pre-stage LUT in a 3:1 division. (c) is an illustration of an image signal output from the frame memory to a post-stage LUT in the same 3:1 division.
Figure 5:
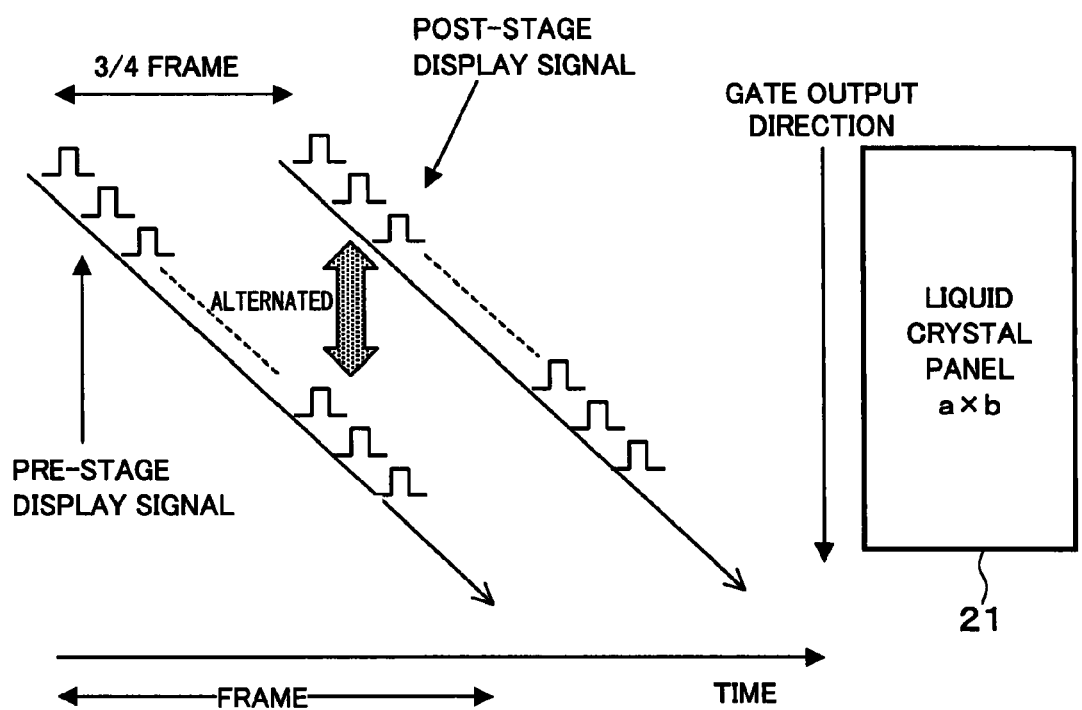
FIG. 5 An illustration of gate line ON timings in relation to a pre-stage display signal and a post-stage display signal for a 3:1 frame division on the display device shown in FIG. 1.

FIG. 4(*a*) is an illustration of an image signal fed to the frame memory 11. FIG. 4(*b*) is an illustration of another image signal supplied from the frame memory 11 to the pre-stage LUT 12 when the division ratio is 3:1. FIG. 4(*c*) is an illustration of another image signal supplied to the post-stage LUT 13 in the same manner. FIG. 5 is an illustration of gate line ON timings in relation to the post-stage display signal and the pre-stage display signal when the division ratio is 3:1 as above.

As depicted in these figures, in this case, the control section 15 writes a pre-stage display signal for the first frame to the pixels on the gate lines in accordance with the ordinary clock. Then, after three quarters of the frame period, the control section 15 starts writing a post-stage display signal. From this moment on, a pre-stage display signal and a post-stage display signal are written alternately in accordance with the double clock.

In other words, after writing a pre-stage display signal to the pixels on the first three quarters of all the gate lines, the post-stage display signal associated with the first gate line is stored in the source driver 23, and that gate line is turned on. Next, the pre-stage display signal associated with the gate line that immediately follows the first three quarters of all the gate lines is stored in the source driver 23, and that gate line is turned on.

This configuration of alternately outputting the pre-stage display signals and the post-stage display signals in accordance with the double clock after three quarters of the first frame enables the division ratio setting for the preceding subframe and the succeeding subframe to 3:1. The total display luminance over these two subframes (integral sum) equals the integral luminance over one frame. The data stored in the frame memory 11 is supplied to the source driver 23 in accordance with gate timings.

Figure 7:
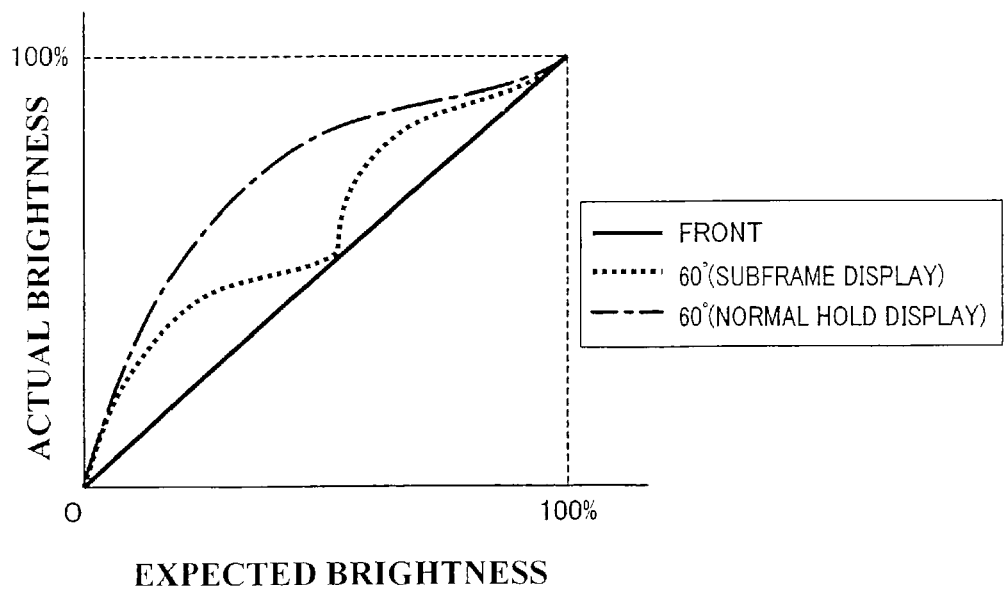
FIG. 7 A graph representing the relationship between expected brightness and actual brightness for a 3:1 frame division on the display device shown in FIG. 1.

FIG. 7 a graph representing a relationship between the expected brightness and the actual brightness when the frame division ratio is 3:1. As shown in FIG. 7, in this configuration, the frame is divided where the discrepancy of the actual brightness from the expected brightness is the largest. Therefore, the difference between the expected brightness and the actual brightness is very small in the case of viewing angle=60° when compared to the results shown in FIG. 6.

In other words, the present display device, in the case of low luminance (low brightness) up to Tmax/4, designates the preceding subframe for black display and uses only the succeeding subframe to produce a display so long as the integral luminance over one frame does not change. Therefore, the discrepancy in the preceding subframe (the difference between the actual brightness and the expected brightness) is reduced to a minimum; the total discrepancy in the two subframes can be reduced to about half as indicated by the broken line in FIG. 7.

In contrast, in a high luminance case, the luminance in only the preceding subframe is adjusted to produce a display, with the succeeding subframe being designated for white display, so long as the integral luminance over one frame does not change. Therefore, the discrepancy in the succeeding subframe in this case is reduced again to a minimum; the total discrepancy in the two subframes can be reduced to about half as indicated by the broken line in FIG. 7.

As explained above, the present display device is capable of reducing overall brightness discrepancy to about half that for structures for ordinary hold display. That more effectively reduces brightness/excess brightness in halftone images (excess brightness phenomenon) shown in FIG. 2.

In the above description, the pre-stage display signal for the first frame written to the pixels on the gate lines in accordance with the ordinary clock in the first three quarters of the frame period since the display is started. This is because a timing is yet to come to write the post-stage display signals.

An alternative approach is to use dummy post-stage display signals so that a display may be produced in accordance with the double clock since the display is started. In other words, a pre-stage display signal and a post-stage display signal with signal grayscale level 0 (dummy post-stage display signal) may be alternately output in the first three quarters of the frame period since the display is started.

Now, the following will describe a more general case where the ratio of the preceding subframe and the succeeding subframe equals n:1. In that case, the control section 15, to achieve a luminance 1/(n+1) times the maximum luminance (threshold luminance; Tmax/(n+1)) in one frame (in a low luminance case), designates the preceding subframe for a minimum luminance (black) and adjusts the display luminance in only the succeeding subframe to produce a grayscale display (only the succeeding subframe is used to produce a grayscale display). The integral luminance over one frame here equals (minimum luminance+luminance in the succeeding subframe)/(n+1).

To achieve a higher luminance than the threshold luminance (Tmax/(n+1)) (in a high luminance case), the control section 15 designates the succeeding subframe for a maximum luminance (white) and adjusts the display luminance in the preceding subframe to produce a grayscale display. The integral luminance over one frame here equals (luminance in the preceding subframe+maximum luminance)/(n+1).

Now, the following will specifically describe such signal grayscale level settings for the display signals (pre-stage display signal and post-stage display signal) that this particular display luminance is achieved. The signal grayscale levels (and output operation which will be detailed later) in this case are also set so as to meet conditions (a), (b).

First, the control section 15 calculates in advance a frame grayscale level corresponding to the threshold luminance (Tmax/(n+1)) by equation 1.

In other words, rearranging equation 1, the frame grayscale level (threshold luminance grayscale level; Lt) which is in accordance with the display luminance is given by:

$$Lt = (1/(n+1))^{(1/\gamma)} \times Lmax \quad (10)$$

When displaying an image, the control section 15 calculates the frame grayscale level L from the image signal output of the frame memory 11.

If $L \leq Lt$, the control section 15 controls the pre-stage LUT 12 to set the luminance grayscale level represented by the pre-stage display signal (termed F) to a minimum (0).

Meanwhile, the control section 15 controls the post-stage LUT 13 to set the luminance grayscale level represented by the post-stage display signal (termed R) by equation 1 so that $$R = (1/(n+1))^{(1/\gamma)} \times L \quad (11)$$

If the frame grayscale level L>Lt, the control section 15 sets the luminance grayscale level represented by the post-stage display signal R to a maximum (255). Meanwhile, the control section 15, using equation 1, sets the luminance in the preceding subframe grayscale level F to:

$$F = ((L^\gamma - (1/(n+1)) \times Lmax^\gamma))^{(1/\gamma)} \quad (12)$$

The display signal output operation for a 3:1 frame division needs only to be designed to start alternately outputting the pre-stage display signals and the post-stage display signals in accordance with the double clock when the first n/(n+1) of the first frame has elapsed.

The equal frame division structure could be described as below. A frame is divided into 1+n (=1) subframe periods. Pre-stage display signals are output in one subframe period in accordance with a clock 1+n (=1) times an ordinary clock. Post-stage display signals are output continuously in the last n (=1) subframe periods.

This structure however needs a very fast clock when n≧2 and adds to device cost. Therefore, the structure explained above in which the pre-stage display signals and the post-stage display signals are alternately output is preferred when n≧2.

In this case, the ratio of the preceding subframe and the succeeding subframe can be set to n:1 by adjusting the output timings of the post-stage display signals. Therefore, the necessary clock frequency can be maintained at double the ordinary frequency.

In the present embodiment, the control section 15 converts the image signals to the display signals in the pre-stage LUT 12 and the post-stage LUT 13. The present display device may include more than one pre-stage LUTs 12 and post-stage LUTs 13.

Figure 8:
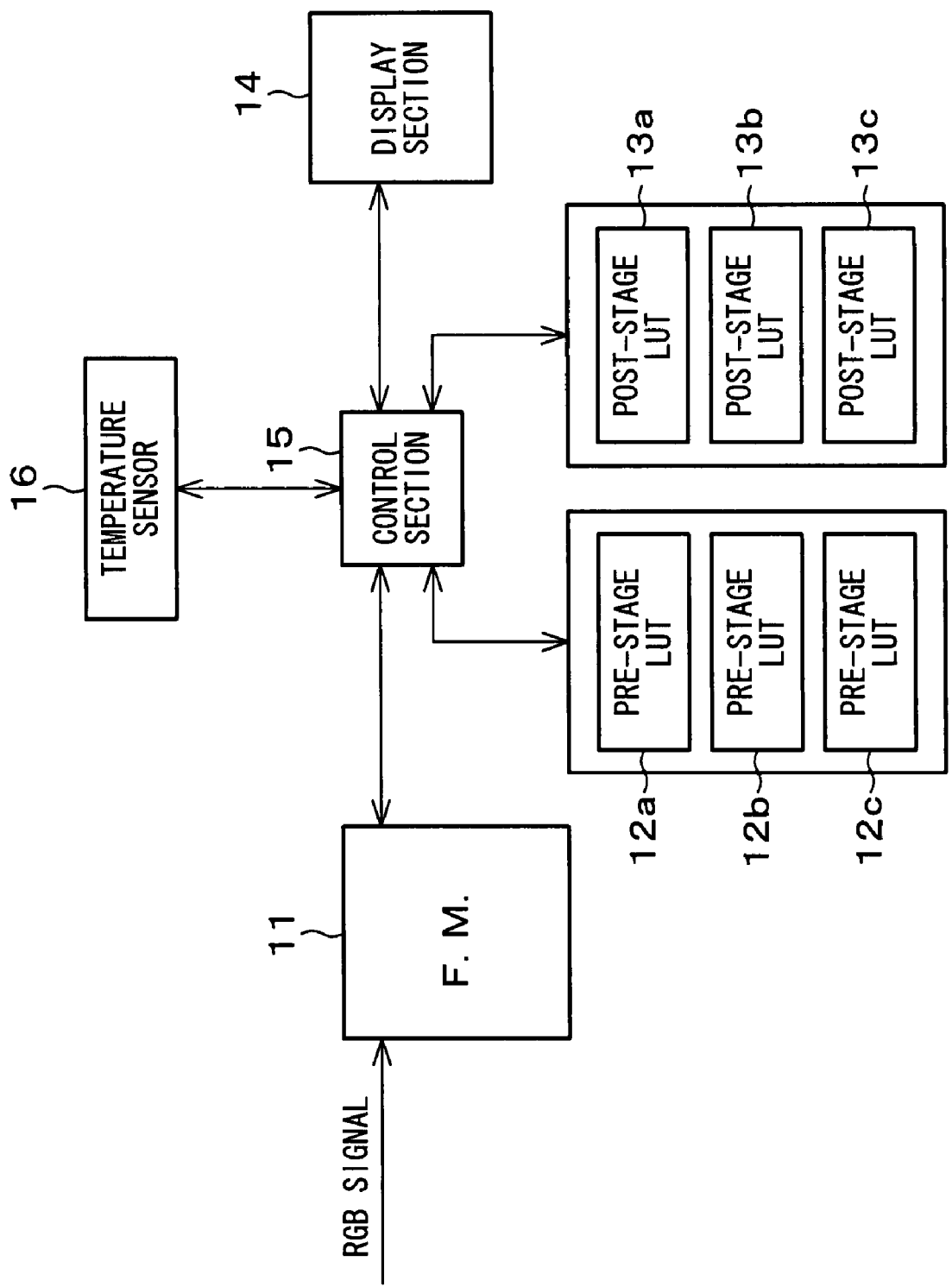
FIG. 8 An illustration of a partially altered version of the structure of the display device shown in FIG. 1.

FIG. 8 shows a modification to the structure shown in FIG. 1 in which the pre-stage LUT 12 is replaced with three pre-stage LUTs 12a to 12c and the post-stage LUT 13 is replaced with three post-stage LUTs 13a to 13c. The structure also includes a temperature sensor 16.

The liquid crystal panel 21 changes its response characteristics and grayscale luminance characteristics depending on ambient temperature (temperature of the environment in which the display section 14 sits). That causes the optimal display signals in accordance with the image signals to change with the ambient temperature.

The pre-stage LUTs 12a to 12c are suitable for use in mutually different temperature ranges. Likewise, the post-stage LUTs 13a to 13c are suitable for use in mutually different temperature ranges.

The temperature sensor 16 measures the ambient temperature of the present display device and supplies results of the measurement to the control section 15.

In this structure, the control section 15 is designed to switch between the LUTs based on the ambient temperature information supplied by the temperature sensor 16. Therefore, the structure is capable of providing display signals more suitable to the image signals to the liquid crystal panel 21. That enables image display with higher fidelity luminance throughout the anticipated temperature range (for example, from 0° C. to 65° C.).

Furthermore, the liquid crystal panel 21 is preferably AC driven because AC driving enables switching of pixel charge polarity (polarity of the voltage across pixel electrodes sandwiching liquid crystal (electrode-to-electrode voltage)) for each frame.

DC driving applies biased voltage across the electrodes and causes electric charge to accumulate between the electrodes. If the condition continues, potential difference persists between electrodes (generally called an "etching" or "burn-in" phenomenon) even in the absence of voltage application.

In subframe display as carried out on the present display device, the value (absolute value) of the voltage applied across the pixel electrodes often differs from one subframe to the next.

Therefore, if the polarity of the electrode-to-electrode voltage is reversed at the subframe cycle, the applied electrode-to-electrode voltage is biased due to the voltage change between the preceding subframe and the succeeding subframe. If the liquid crystal panel 21 is driven for an extended period of time, electric charge accumulates between the electrodes, possibly causing the etching or flickering mentioned above.

Accordingly, in the present display device, the polarity of the electrode-to-electrode voltage is preferably reversed at a frame cycle (cycle of one frame duration). There are two approaches to the reversing of the polarity of the electrode-to-electrode voltage at a frame cycle. One of them is to apply voltage of the same polarity throughout a frame. The other approach is to reverse the polarity of the electrode-to-electrode voltage between the two subframes in each frame and maintain the polarity over each succeeding subframe and the preceding subframe of the immediately following frame.

Figure 9:
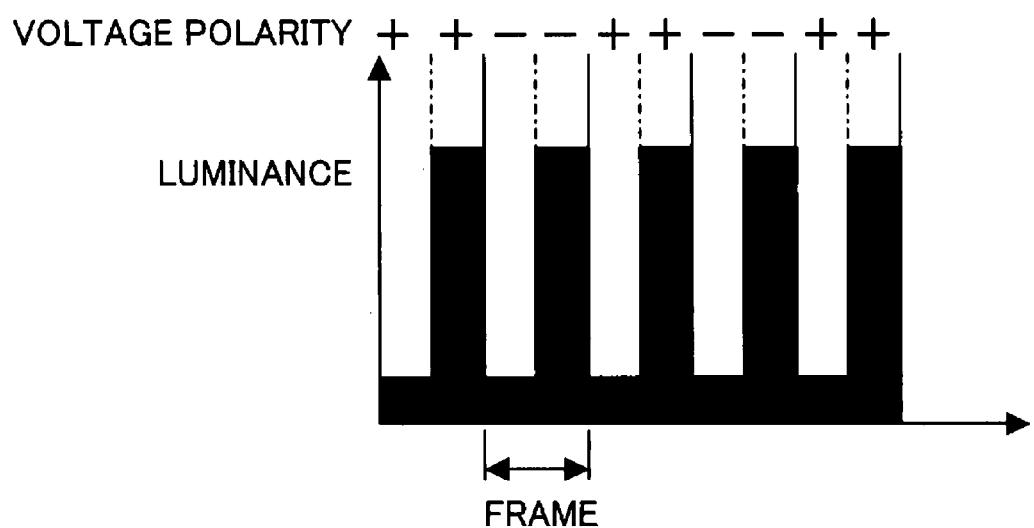
FIG. 9(a) An illustration of a method whereby the polarity of an electrode-to-electrode voltage is reversed at a frame cycle.
FIG. 9(b) An illustration of a method whereby the polarity of an electrode-to-electrode voltage is reversed at a frame cycle.
Figure 9:
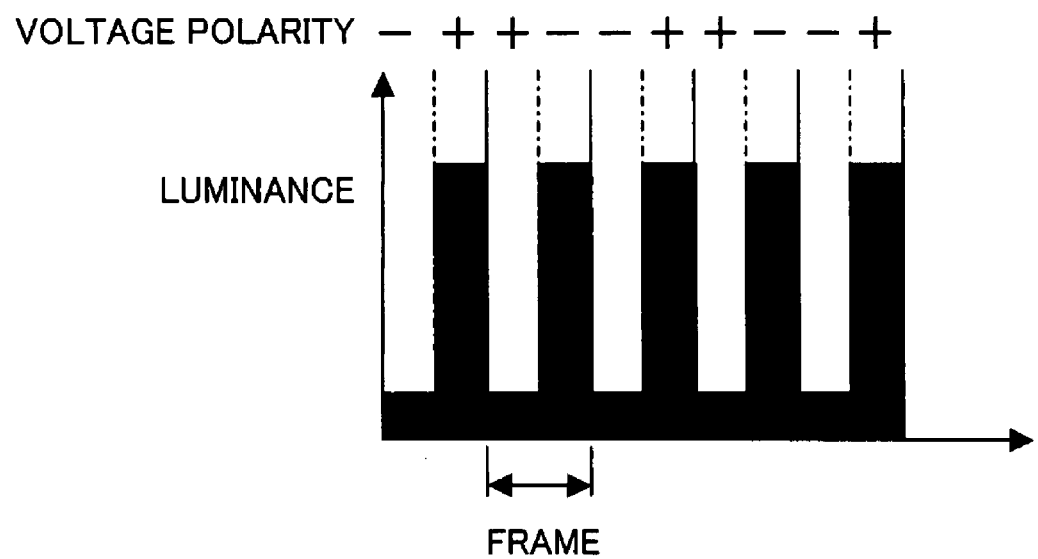

FIG. 9(a) depicts a relationship between the voltage polarity (polarity of the electrode-to-electrode voltage) and the frame cycle for the former approach. FIG. 9(b) depicts a relationship between the voltage polarity and the frame cycle for the latter approach. Alternating the electrode-to-electrode voltage at the frame cycle in this manner prevents etching and flickering even when the electrode-to-electrode voltage differs greatly from one subframe to the next.

As described earlier, the present display device drives the liquid crystal panel 21 according to a subframe display scheme. That is how the device mitigates excess brightness. However, this advantage of subframe display can be somewhat lost if the liquid crystal has a slow response rate (rate at which the voltage across the liquid crystal (electrode-to-electrode voltage) becomes equal to the applied voltage).

In other words, for ordinary hold display on a TFT liquid crystal panel, one liquid crystal state corresponds to a luminance grayscale level. Therefore, the response characteristics of the liquid crystal does not depend on the luminance grayscale level represented by the display signal.

Figure 10:
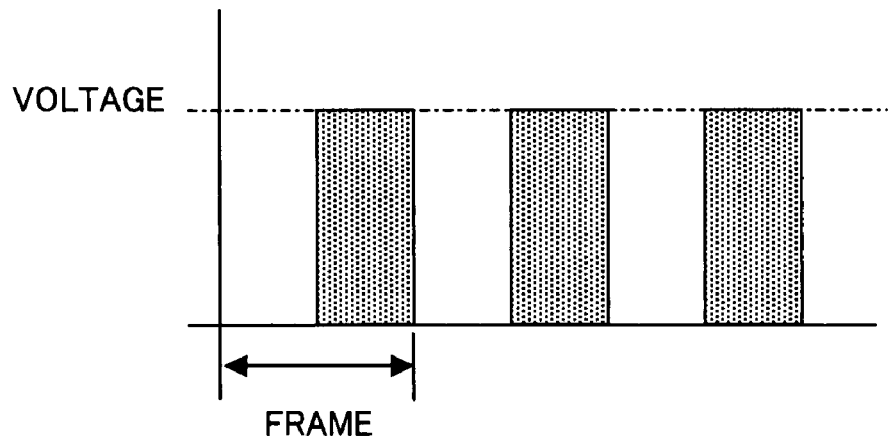
FIG. 10(a) An illustration depicting the response rate of liquid crystal.
FIG. 10(b) An illustration depicting the response rate of liquid crystal.
FIG. 10(c) An illustration depicting the response rate of liquid crystal.
Figure 10:
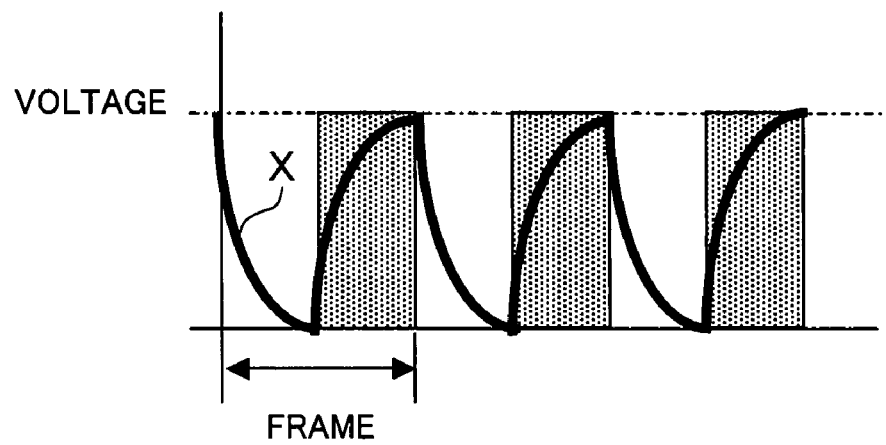
Figure 10:
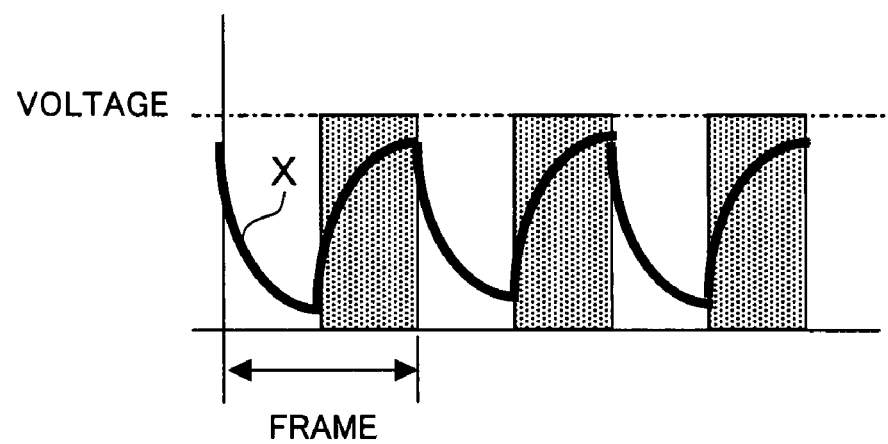

On the other hand, in subframe display as carried out on the present display device, to produce a display from a display signal representing a halftone grayscale level, in which the preceding subframe is designated for a minimum luminance (white) and the succeeding subframe is designated for a maximum luminance, the voltage applied across the liquid crystal over one frame alters as shown in FIG. 10(a). The electrode-to-electrode voltage changes as indicated by solid line X in FIG. 10(b) in accordance with the response rate (response characteristics) of the liquid crystal.

If that halftone display is produced when the liquid crystal has a slow response rate, the electrode-to-electrode voltage (solid line X) changes as shown in FIG. 10(c). Therefore, in this case, the display luminance in the preceding subframe is not a minimum and the display luminance in the succeeding subframe is not a maximum.

Figure 11:
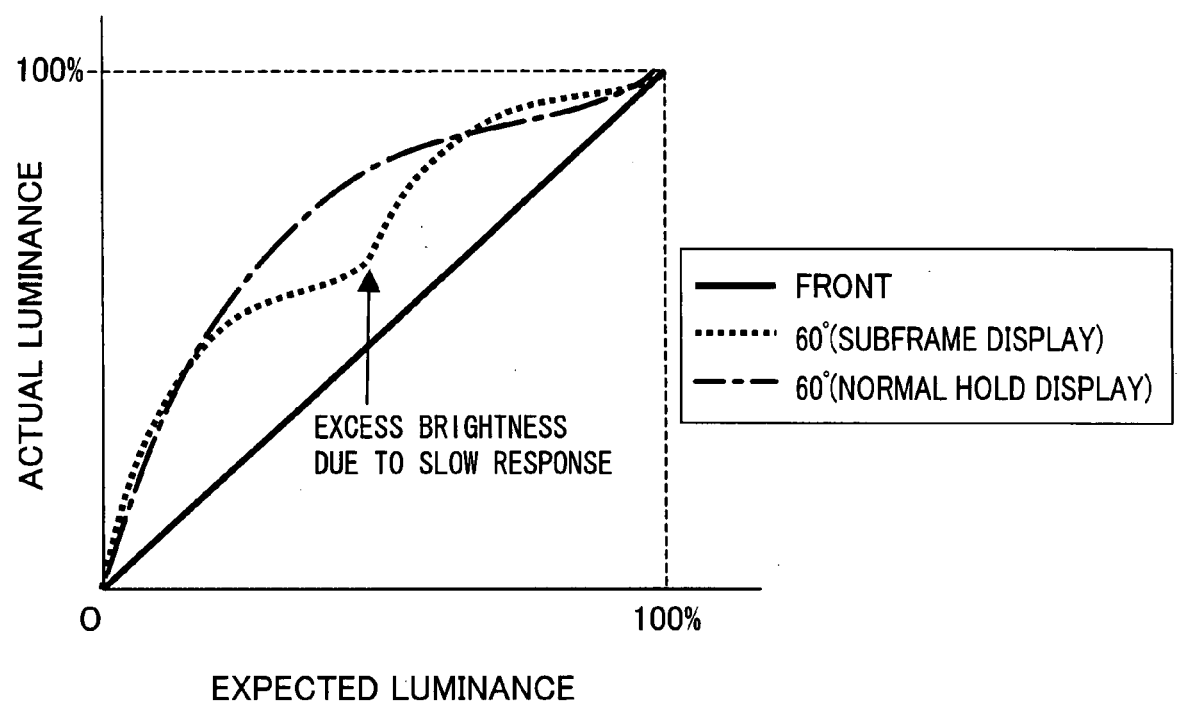
FIG. 11 A graph representing display luminance outputs of a liquid crystal panel (relationship between expected luminance and actual luminance) for subframe display using a slow-response liquid crystal.

Hence, the relationship between the expected luminance and the actual luminance can be represented as shown in FIG. 11. The graph indicates that the subframe display fails at large viewing angles to produce a display with such luminance (minimum luminance and maximum luminance) that the difference (discrepancy) between the expected luminance and the actual luminance is small. The excess brightness phenomenon is thus less mitigated.

Therefore, to perform good subframe display as carried out by the present display device, the response rate of the liquid crystal in the liquid crystal panel 21 is preferably designed to meet conditions (c) and (d):
(c) If a voltage signal for a maximum luminance (white; equivalent to a maximum brightness), generated by the source driver 23 from a display signal, is applied to liquid crystal outputting a minimum luminance (black; equivalent to a minimum brightness), the voltage across the liquid crystal (electrode-to-electrode voltage) reaches 90% or more of the voltage represented by the voltage signal in the shorter one of two subframe periods (the actual brightness as viewed from the front reaches 90% of the maximum brightness); and
(d) If a voltage signal for a minimum luminance (black) is applied to liquid crystal outputting a maximum luminance (white), the voltage across the liquid crystal (electrode-to-electrode voltage) reaches 5% or less of the voltage represented by the voltage signal in the shorter one of two subframe periods (the actual brightness as viewed from the front reaches 5% of the minimum brightness).

The control section 15 is preferably designed to monitor the response rate of the liquid crystal.

The control section 15 may be set up to discontinue the subframe display to drive the liquid crystal panel 21 by ordinary hold display if changes in ambient temperature or other factors slow down the response rate of the liquid crystal so much that the control section 15 has determined that it is no longer capable of meeting conditions (c), (d).

The setup enables switching of the display scheme of the liquid crystal panel 21 to ordinary hold display when the subframe display has intensified, rather than mitigated, an excess brightness phenomenon.

Figure 32:
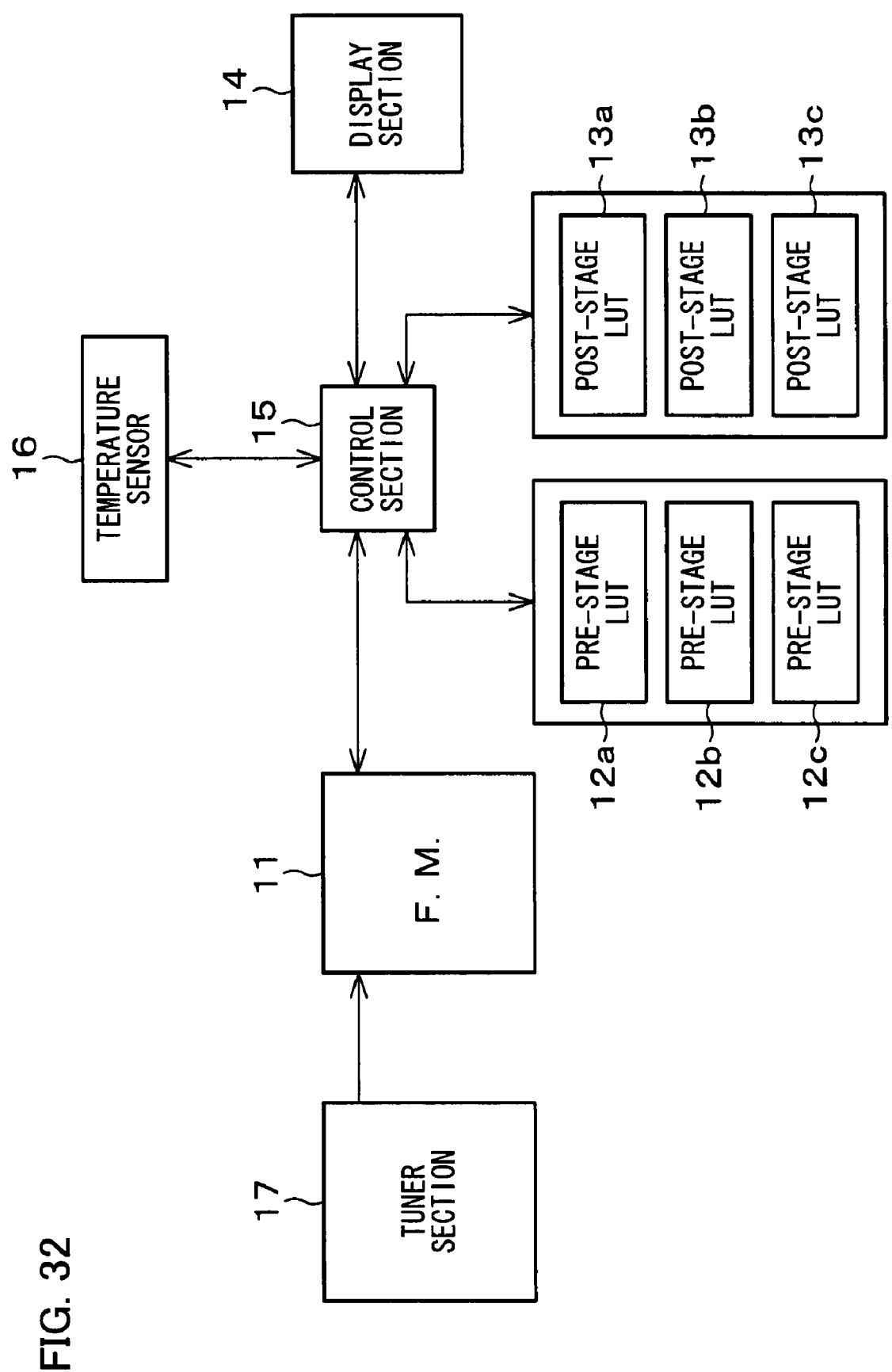
FIG. 32 An illustration of the structure of a liquid crystal television including the display device shown in FIG. 8.

In the present embodiment, the present display device functions as a liquid crystal monitor. The present display device, however, may function as a liquid crystal television receiver (liquid crystal television). The liquid crystal television is realized by adding a tuner section 17 to the present display device shown in FIG. 8 as shown in FIG. 32. A channel is selected from television broadcast signals with the tuner section 17. The television image signals on the selected channel is transmitted to the control section 15 via circuitry (not shown) which performs various video processes.

In this structure, the control section 15 generates the display signals from the television image signals. The liquid crystal television can be realized also by adding a tuner section 17 to the present display device shown in FIG. 1.

In the present embodiment, in low luminance cases, the preceding subframe is designated for black, and only the succeeding subframe is used to produce a grayscale display. The same display is achieved even when the settings for the two subframes are transposed (in low luminance cases; the succeeding subframe is designated for black, and only the preceding subframe to produce a grayscale display).

In the present embodiment, the luminance grayscale levels of the display signals (pre-stage display signal and post-stage display signal) (signal grayscale levels) are set using equation 1. However, the actual panel has luminance even in black display cases (grayscale level=0), and moreover, the response rate of the liquid crystal is finite. Therefore, these factors are preferably taken into account in the setting of signal grayscale levels. More specifically, it is preferable to actually produce an image on the liquid crystal panel 21, actually measure relationship between the signal grayscale levels and the display luminance, and determine an LUT (output table) that fits equation 1 from results of the actual measurement.

In the present embodiment, $\alpha$ in equation (6a) is set in the range of 2.2 to 3. The range, although not technically proven, can be considered suitable in relation to human vision.

If a source driver for ordinary hold display is used as the source driver 23 in the present display device, voltage signals are supplied to pixels (liquid crystal) in accordance with the incoming signal grayscale levels (luminance grayscale level represented by a display signal) so that the display luminance obtained by setting $\gamma$ to 2.2 in equation 1 can be obtained.

That source driver 23 outputs voltage signals as they are used in ordinary hold display in accordance with the incoming signal grayscale levels in each subframe even when subframe display is carried out.

This voltage signal output method may fail to equate the total luminance in one frame in subframe display to a value in the case of ordinary hold display (may fail to reproduce from the signal grayscale levels).

Therefore, in subframe display, the source driver 23 is preferably designed to output voltage signals converted for divided luminance. In other words, the source driver 23 is preferably set up to fine tune the voltage applied to the liquid crystal (electrode-to-electrode voltage) in accordance with the signal grayscale levels. To this end, it is preferable to design the source driver 23 for subframe display to enable the fine tuning.

In the present embodiment, the liquid crystal panel 21 is a VA panel. This is however not the only possibility. The excess brightness phenomenon can be mitigated by subframe display on the present display device even by using a liquid crystal panel of mode other than VA mode.

In other words, the subframe display implemented by the present display device is capable of mitigating the excess brightness phenomenon on liquid crystal panels with which there occurs a discrepancy between the expected luminance (expected brightness) and the actual luminance (actual brightness) at large viewing angles (liquid crystal panels of a mode in which grayscale gamma characteristics may change in relation to viewing angle change). The subframe display implemented by the present display device is particularly effective with liquid crystal panels having such characteristics that the display luminance intensifies with increasing viewing angle.

The liquid crystal panel 21 in the present display device may be NB (Normally Black; normally black) or NW (Normally White; normally white). Furthermore, in the present display device, the liquid crystal panel 21 may be replaced with another display panel (for example, an organic EL panel or a plasma display device panel).

The frame is preferably divided into 1:3 to 1:7 in the present embodiment. This is however not the only possibility. The present display device may be designed to divide the frame into 1:n or n:1 (n is a natural number greater than or equal to 1).

The present embodiment uses equation (10) to make signal grayscale level settings for the display signals (pre-stage display signal and post-stage display signal). The settings are made assuming that the response rate of the liquid crystal is 0 ms and that T0 (minimum luminance)=0. Therefore, in actual use, more elaborate settings are preferred.

Specifically, the maximum luminance (threshold luminance) that can be reached in one of the two subframes (succeeding subframe) equals Tmax/(n+1) when the liquid crystal response is 0 ms and T0=0. The threshold luminance grayscale level Lt is the frame grayscale level of that luminance.

$$Lt=((T\max/(n+1)-T0)/(T\max-T0))^{(1/\gamma)}$$

$$(\gamma=2.2, T0=0)$$

If the response rate of the liquid crystal is not 0, for example, black→white is a Y % response in a subframe, white→black is a Z % response in a subframe, and T0=T0, the threshold luminance (Lt luminance) Tt is given by $$Tt=((T\max-T0)\times Y/100+(T\max-T0)\times Z/100)/2$$

Therefore, $$Lt=((Tt-T0)/(T\max-T0))^{(1/\gamma)}$$

$$(\gamma=2.2)$$

Actually, Lt can in some cases be a little more complex with the threshold luminance Tt being unable to be given by a simple equation, making it difficult to give Lt in terms of Lmax. To obtain Lt in such cases, it is preferred to use results of measurement of the luminance of the liquid crystal panel. In other words, the luminance of the liquid crystal panel in a case where one of the two subframes outputs a maximum luminance, and the other subframe outputs a minimum luminance is measured, and the luminance is denoted by Tt. A spilled grayscale level Lt is determined from the following equation.

$$Lt=((Tt-T0)/(T\max-T0))^{(1/\gamma)}$$

$$(\gamma=2.2)$$

In this manner, it can be said that Lt obtained by using equation (10) has an ideal value and is in some cases preferably used as a rough reference.

Now, the fact that in the present display device, the polarity of the electrode-to-electrode voltage is preferably reversed at the frame cycle will be described in more detail. FIG. 12(*a*) is a graph representing the luminance in the preceding subframe and the succeeding subframe for a display luminance three quarters of Lmax and a display luminance a quarter of Lmax. As shown in the figure, when subframe display is carried out as on the present display device, the value of the voltage applied to the liquid crystal (value of the voltage applied across the pixel electrodes; absolute value) differs from one subframe to the next.

Therefore, if the polarity of the voltage applied to the liquid crystal (liquid crystal driving voltage) is reversed at the subframe cycle, as shown in FIG. 12(*b*), there occurs an irregular applied liquid crystal driving voltage (the total applied voltage does not equal 0 V) due to difference in voltage value between the preceding subframe and the succeeding subframe. Therefore, the DC component of the liquid crystal driving voltage cannot be eliminated. Thus, if the liquid crystal panel 21 is driven for an extended period of time, electric charge accumulates between the electrodes, thereby possibly causing etching, burn-in, or flickering.

Accordingly, in the present display device, the polarity of the liquid crystal driving voltage is preferably reversed at the frame cycle. There are two approaches to the reversing of the polarity of the liquid crystal driving voltage at the frame cycle. One of them is to apply voltage of the same polarity throughout a frame. The other approach is to reverse the polarity of the liquid crystal driving voltage between the two subframes in each frame and maintain the polarity over each succeeding subframe and the preceding subframe of the immediately following frame.

FIG. 13(*a*) is a graph representing a relationship between the voltage polarity (liquid crystal driving voltage polarity), the frame cycle, and the liquid crystal driving voltage for the former approach. In contrast, FIG. 13(*b*) is a graph representing the same relationship for the latter approach.

As depicted in these graphs, if the liquid crystal driving voltage is reversed at one frame cycle, the total voltage of the preceding subframes of two adjacent frames and the total voltage of the succeeding subframes of the two adjacent frames can be rendered 0 V. Therefore, the total voltage over the two frames can be rendered 0 V, making it possible to eliminate the DC component of the applied voltage. Alternating the liquid crystal driving voltage at the frame cycle in this manner prevents etching, burn-in, and flickering even when the liquid crystal driving voltage differs greatly from one subframe to the next.

Figure 14:
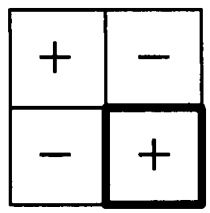
FIG. 14(a) An illustration showing four pixels in a liquid crystal panel and the polarities of liquid crystal driving voltages for the pixels.
FIG. 14(b) An illustration showing four pixels in a liquid crystal panel and the polarities of liquid crystal driving voltages for the pixels.
FIG. 14(c) An illustration showing four pixels in a liquid crystal panel and the polarities of liquid crystal driving voltages for the pixels.
FIG. 14(d) An illustration showing four pixels in a liquid crystal panel and the polarities of liquid crystal driving voltages for the pixels.
Figure 14:
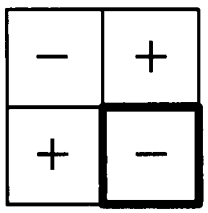
Figure 14:
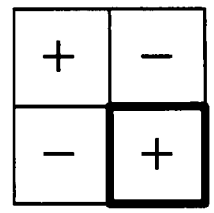
Figure 14:
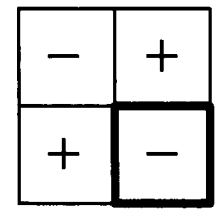

FIGS. 14(*a*) to 14(*d*) are illustrations showing four pixels in the liquid crystal panel 21 and the polarities of liquid crystal driving voltages for pixels. As mentioned earlier, the polarity of the voltage applied to each pixel is preferably reversed at the frame cycle. In a case like this, the polarities of the liquid crystal driving voltages for the pixels are changed at a frame cycle as shown in the order of FIGS. 14(*a*) to 14(*d*).

The sum of the liquid crystal driving voltages applied to all the pixels in the liquid crystal panel 21 is preferably 0 V. This control can be realized by, for example, changing voltage polarity between adjoining pixels as shown in FIGS. 14(a) to 14(d).

Figure 15:
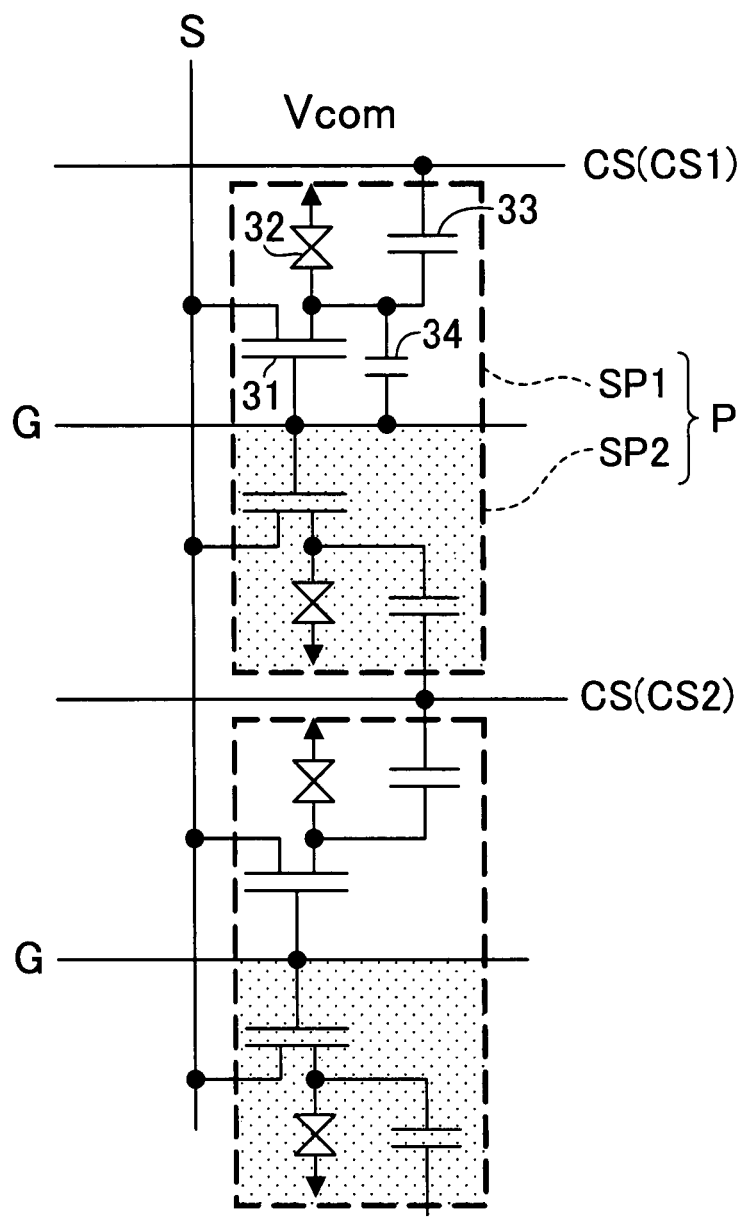
FIG. 15 An illustration of the structure of a liquid crystal panel driven by pixel divisional driving.

The present display device may be designed to perform pixel divisional driving (area ratio grayscale driving). The following will describe pixel divisional driving for the present display device. FIG. 15 is an illustration of the structure of the liquid crystal panel 21 driven by the pixel divisional driving.

As shown in the figure, in the pixel divisional driving, a pixel P, connected to a gate line G and a source line S in the liquid crystal panel 21, is divided into two subpixels SP1, SP2. A different voltage is applied to the subpixels SP1, SP2 for display. Pixel divisional driving is described, for example, in Patent Documents 4 to 7.

The following will briefly describe the pixel divisional driving. Referring to FIG. 15, there are provided two auxiliary capacitive lines CS1, CS2 flanking a pixel P in the present display device structured for the pixel divisional driving. The auxiliary capacitive lines CS1, CS2 are connected to the subpixels SP1, SP2 respectively.

Each subpixel SP1, SP2 has a TFT 31, a liquid crystal capacitance 32, and an auxiliary capacitance 33. The TFT 31 is connected to the gate line G, the source line S, and the liquid crystal capacitance 32. The auxiliary capacitance 33 is connected to the TFT 31, the liquid crystal capacitance 32, and the auxiliary capacitive line CS1 or CS2. Auxiliary signals, or AC voltage signals with a predetermined frequency and in opposite phase (180° out of phase), are applied to the auxiliary capacitive lines CS1, CS2.

The liquid crystal capacitance 32 is connected to the TFT 31, a common voltage Vcom, and the auxiliary capacitance 33. The liquid crystal capacitance 32 is connected to a parasitic capacitance 34 arising between the capacitance 32 and the gate line G.

Figure 16:
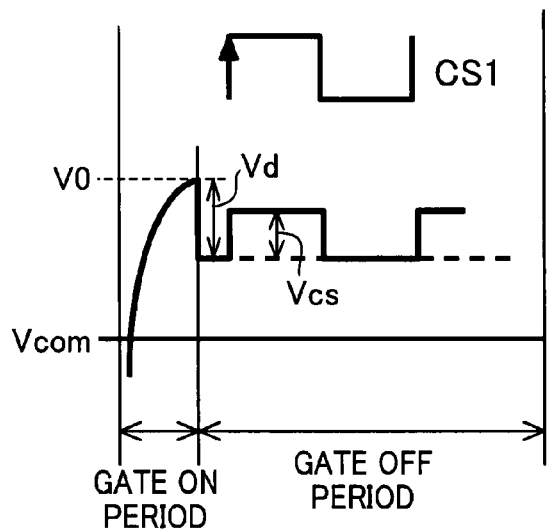
FIG. 16(a) A graph representing a liquid crystal driving voltage (that is, voltage applied to the liquid crystal capacitance of a subpixel) in a case where a positive display signal Vcom) is applied to a source line S.
FIG. 16(b) A graph representing a liquid crystal driving voltage (that is, voltage applied to the liquid crystal capacitance of a subpixel) in a case where a negative display signal ($\geqq$Vcom) is applied to a source line S.
FIG. 16(c) A graph representing a liquid crystal driving voltage (that is, voltage applied to the liquid crystal capacitance of a subpixel) in a case where a positive display signal Vcom) is applied to a source line S.
FIG. 16(d) A graph representing a liquid crystal driving voltage (that is, voltage applied to the liquid crystal capacitance of a subpixel) in a case where a negative display signal Vcom) is applied to a source line S.
Figure 16:
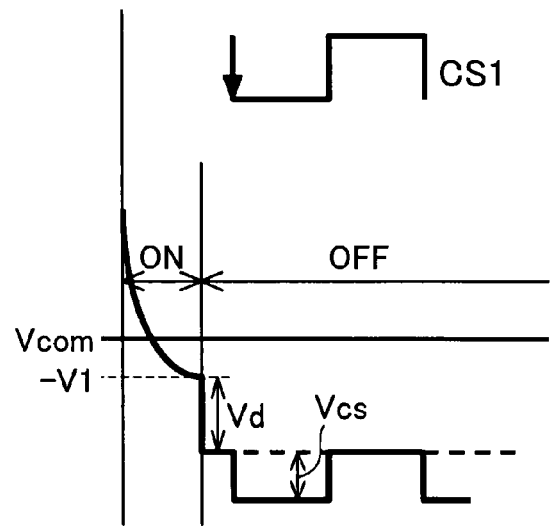
Figure 16:
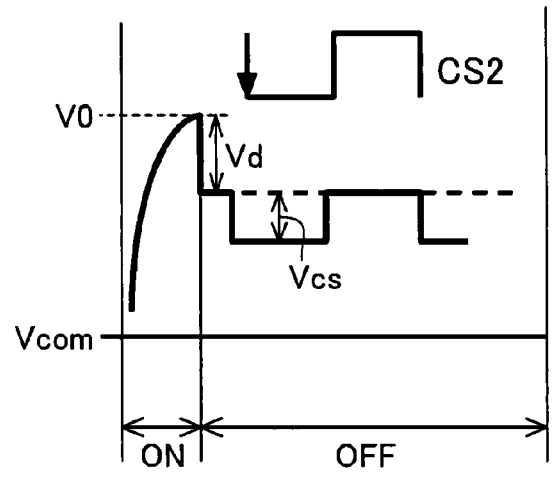
Figure 16:
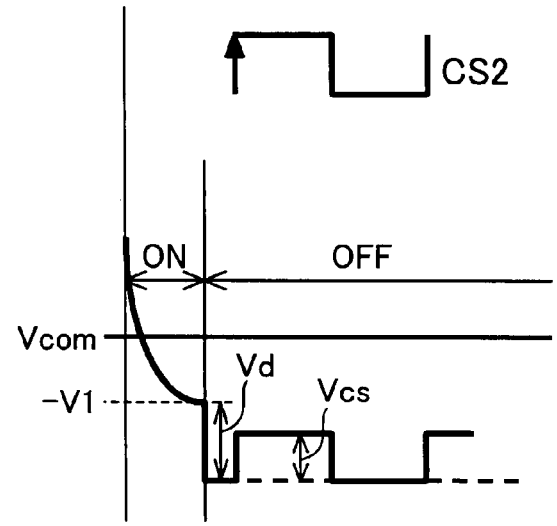

In the structure, as the gate line G goes ON, the TFTs 31 in the subpixels SP1, SP2 in the pixel P conduct. FIGS. 16(a) and 16(c) are graphs representing a voltage (liquid crystal driving voltage) applied to the liquid crystal capacitances 32 in the subpixels SP1, SP2 when a positive display signal (≧Vcom) is applied to the source line S. In this situation, the voltage across the liquid crystal capacitances in the subpixels SP1, SP2 rises to a value (V0) in accordance with the display signal as shown in FIGS. 16(a) and 16(c).

As the gate line G goes OFF, the liquid crystal driving voltage falls only by Vd because of a gate drawing phenomenon caused by the parasitic capacitance 34. If the auxiliary signal on the auxiliary capacitive line CS1 rises (changes from LOW to HIGH) as shown in FIG. 16(a), the liquid crystal driving voltage for the subpixel SP1 connected to the line CS1 rises by Vcs (a value in accordance with the amplitude of the auxiliary signal on the auxiliary capacitive line CS1). The liquid crystal driving voltage oscillates between V0 and V0-Vd with an amplitude Vcs according to the frequency of the auxiliary signal on the auxiliary capacitive line CS1.

Meanwhile, the auxiliary signal on the auxiliary capacitive line CS2 falls (changes from HIGH to LOW) as shown in FIG. 16(c) in this case. The liquid crystal driving voltage for the subpixel SP2 connected to the line CS2 falls only by the value Vcs which corresponds to the amplitude of the auxiliary signal. Thereafter, the liquid crystal driving voltage oscillates between V0-Vd and V0-Vd-Vcs.

FIGS. 16(b) and 16(d) are graphs representing the liquid crystal driving voltage for the subpixels SP1, SP2 when a negative display signal Vcom) is applied to the source line S as the gate line G goes ON. In a case like this, as depicted in the figures, the liquid crystal driving voltages for the subpixels SP1, SP2 fall to a value (−V1) which corresponds to the display signal.

Thereafter, as the gate line G goes OFF, the liquid crystal driving voltages falls by another Vd due to the drawing phenomenon. In this situation, if the auxiliary signal on the auxiliary capacitive line CS1 falls as shown in FIG. 16(b), the liquid crystal driving voltage for the subpixel SP1 connected to the line CS1 fall by another Vcs. The liquid crystal driving voltage oscillates between −V0-Vd-Vcs and −V0-Vd.

In contrast, In a case like this, the auxiliary signal on the auxiliary capacitive line CS2 rises as shown in FIG. 16(d). The liquid crystal driving voltage for the subpixel SP2 connected to the line CS2 rises by Vcs and thereafter oscillates between V0-Vd and V0-Vd-Vcs.

In this manner, applying the auxiliary signal that are 180° out of phase to the auxiliary capacitive lines CS1, CS2 produces different liquid crystal driving voltages for the subpixels SP1, SP2.

In other words, if the display signal on the source line S is positive, in the subpixel fed with an auxiliary signal which rises immediately after the drawing phenomenon, the absolute value of the liquid crystal driving voltage is greater than the display signal voltage (see FIG. 16(a)). In contrast, in the subpixel fed with an auxiliary signal which falls in the same occasion, the absolute value of the liquid crystal driving voltage is less than the display signal voltage (see FIG. 16(c)).

If the display signal on the source line S is negative, in the subpixel fed with an auxiliary signal which falls immediately after the drawing phenomenon, the absolute value of the applied voltage across the liquid crystal capacitance 32 is greater than the display signal voltage (see FIG. 16(b)). In contrast, in the subpixel fed with an auxiliary signal which rises in the same occasion, the absolute value of the liquid crystal driving voltage is greater than the display signal voltage (FIG. 16(d)).

Therefore, liquid crystal driving voltage (its' absolute value) is greater for the subpixel SP1 than for the subpixel SP2 (the display luminance of the subpixel SP1 is higher than that of the subpixel SP2) in the examples shown in FIGS. 16(a) to 16(d). The difference (Vcs) between the liquid crystal driving voltages for the subpixels SP1, SP2 can be controlled in accordance with the amplitudes of the auxiliary signals applied to the auxiliary capacitive lines CS1, CS2. That makes it possible to create a desired difference between the display luminances of the two subpixels SP1, SP2 (first and second luminances).

Table 1 collectively shows the polarities of liquid crystal driving voltages applied a high luminance subpixel (bright pixel) and a low luminance subpixel (dark pixel) and the states of auxiliary signals immediately after the drawing phenomenon. In the table, the polarity of a liquid crystal driving voltage is indicated by "+" and "−." A rise of an auxiliary signal immediately after the drawing phenomenon is indicated by "↑" and a fall by "↓."

TABLE 1

| Bright Pixel | +, ↑ | −, ↓ |
| Dark Pixel | +, ↓ | −, ↑ |

In the pixel divisional driving, the luminance of the pixel P is the sum of the luminances of the two subpixels SP1, SP2 (equivalent to the transmittance of the liquid crystal).

Figure 17:
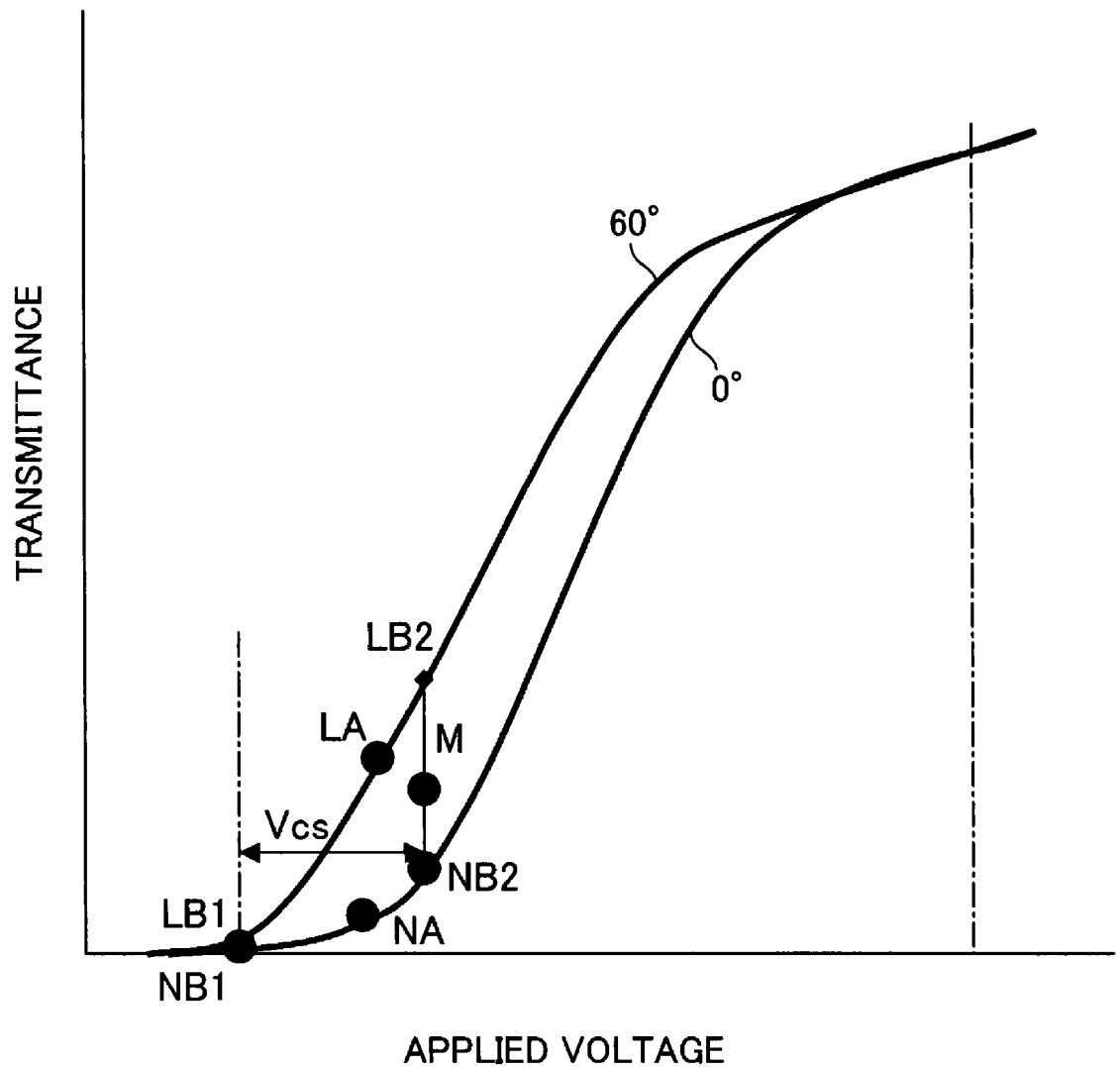
FIG. 17 A graph representing the relationship between the transmittance and applied voltage for a liquid crystal panel 21 at two viewing angles (0°, or as viewed from the front, and 60°) when no pixel divisional driving is implemented.

FIG. 17 is a graph representing the relationship between the transmittance and applied voltage for the liquid crystal panel 21 at two viewing angles (0°, or as viewed from the front, and 60°) when no pixel divisional driving is implemented. As can be seen from the graph, when the transmittance as viewed from the front is NA (the liquid crystal driving voltage is controlled to achieve NA), the transmittance at the 60° viewing angle is LA. To achieve the transmittance of NA at the front in pixel divisional driving, for example, voltages with a difference Vcs should be applied to the two subpixels SP1, SP2, and the transmittances of the subpixels SP1, SP2 should be set to NB1, NB2 respectively (NA=(NB1+NB2)/2).

When the subpixels SP1, SP2 have transmittances of NB1, NB2 respectively at 0°, they have transmittances of LB1, LB2 at 60°. Since LB1 is almost 0, the transmittance for one pixel equals M (=LB2/2), lower than LA. In this manner, the pixel divisional driving improves viewing angle characteristics.

For example, if the pixel divisional driving is employed, low luminance (high luminance) images can be displayed by increasing the CS signal amplitude to set the luminance of one of the subpixels for black display (white display) and adjusting the luminance of the other subpixel. This scheme minimizes discrepancy between the display luminance and the actual luminance in one of the subpixels similarly to the case of subframe display, thereby further improving viewing angle characteristics.

In the above-mentioned scheme, one of the subpixels does not produce black display (white display). In other words, viewing angle characteristics are theoretically improved provided that the two subpixels have a luminance difference. The smaller CS amplitude makes it easier to design the panel driving.

The subpixels SP1, SP2 do not need to have a luminance difference for all the display signals. For example, to produce white display or black display, the subpixels SP1, SP2 preferably output the same luminance. Therefore, the subpixel SP1 only needs to be set up for a first luminance, whereas the subpixel SP2 to a second luminance which differs from the first luminance, for at least one display signal (display signal voltage).

The pixel divisional driving preferably alternates the polarity of the display signal applied to the source line S from one frame to the other. Specifically, if the subpixels SP1, SP2 are driven in a frame as shown in FIGS. 16(a) and 16(c), they are preferably driven as shown in FIGS. 16(b) and 16(d) in the following frame.

Accordingly, the total voltages across the two liquid crystal capacitances 32 in the pixel P over the two frames are 0 V. That cancels the DC component of the applied voltages.

The pixel divisional driving assumes that each pixel is divided two subpixels. This is however not the only possibility. Each pixel may be divided into three or more subpixels.

The pixel divisional driving may be used in combination with ordinary hold display or with subframe display. Alternatively, the pixel divisional driving may be used in combination with the polarity reversion driving shown in FIGS. 12(a), 12(b), 13(a), and 13(b).

The following will describe combinations of pixel divisional driving, subframe display, and polarity reversion driving.

FIG. 18(a) is a graph representing, similarly to FIG. 13(a), changes of a liquid crystal driving voltage (for one pixel) when subframe display is carried out with the polarity of the liquid crystal driving voltage being reversed from one frame to the next.

Combining the subframe display by means of polarity reversion driving with the pixel divisional driving, the liquid crystal driving voltages for the subpixels vary as shown in FIGS. 18(b) and 18(c).

In other words, FIGS. 18(b) and 18(c) are graphs representing a liquid crystal driving voltage for a high luminance subpixel (bright pixel) and a liquid crystal driving voltage for a low luminance subpixel (dark pixel), respectively, when the pixel divisional driving is carried out.

The broken lines indicate liquid crystal driving voltages when no pixel divisional driving is carried out. Solid lines indicate liquid crystal driving voltages when the pixel divisional driving is carried out.

FIGS. 19(a) and 19(b), corresponding to FIGS. 18(b) and 18(c), are graphs representing the luminance of a bright pixel and a dark pixel.

The ↑ and ↓ symbols in these figures indicate the state of the auxiliary signal immediately after the drawing phenomenon (whether the signal rises or falls immediately after the drawing phenomenon). As depicted in these figures, in a case like this, the polarity of the liquid crystal driving voltage for each subpixel is reversed from one frame to the next. This is intended to appropriately cancel the liquid crystal driving voltage which differs from subframe to subframe (to render 0 V the total liquid crystal driving voltage over two frames). The state of the auxiliary signal (phase immediately after the drawing phenomenon; ↑, ↓) is inverted in phase with the polarity reversion.

As a result of the driving, the liquid crystal driving voltage (its absolute value) and luminance in two subframes are high for the bright pixel and low for the dark pixel as shown in FIGS. 18(b), 18(c), 19(a), and 19(b). The increase in the liquid crystal driving voltage for the bright pixel in the preceding subframe matches the decrease for the dark pixel. Similarly, the increase in the liquid crystal driving voltage for the bright pixel in the succeeding subframe matches the decrease for the dark pixel.

Thus, the driving prevents the liquid crystal driving voltage applied to each pixel from having too much of either positive or negative polarity, rendering 0 V the total liquid crystal driving voltage over two frames. (The increase (or decrease) in liquid crystal driving voltage in the pixel divisional driving differs in the preceding subframe and in the succeeding subframe. The difference is caused by the capacitance of liquid crystal varying with the transmittance.)

In the foregoing, the polarity of the liquid crystal driving voltage for each subpixel is reversed from one frame to the next. This is however not the only possibility. The polarity of the liquid crystal driving voltage may be reversed at the frame cycle. Therefore, as shown in FIG. 13(b), the polarity of the liquid crystal driving voltage may be reversed between the two subframes in each frame and maintained over each succeeding subframe and the preceding subframe of the immediately following frame.

Figure 20:
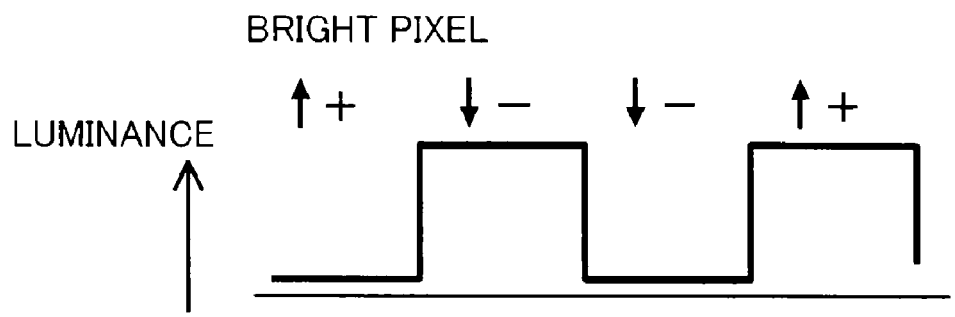
FIG. 20(a) A graph representing the luminance of a bright pixel and a dark pixel with the polarity being reversed at a frame cycle.
FIG. 20(b) A graph representing the luminance of a bright pixel and a dark pixel with the polarity being reversed at a frame cycle.
Figure 20:
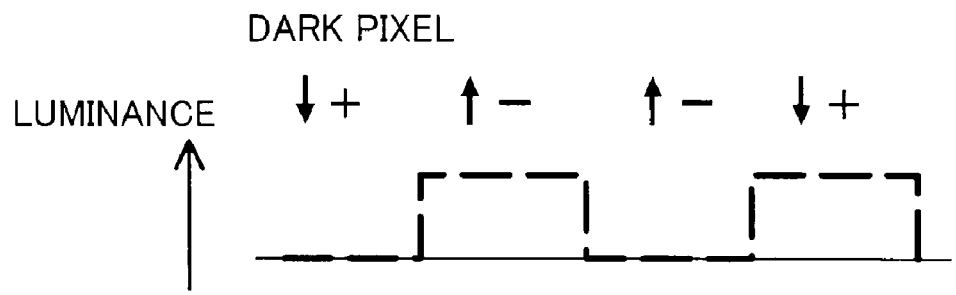

FIGS. 20(a) and 20(b) are graphs representing the luminance of a bright pixel and a dark pixel with the polarity being reversed in this manner.

In this case, the state of the auxiliary signal (↑, ↓) is inverted in phase with the polarity reversion to render 0 V the total liquid crystal driving voltage over the two frames.

Figure 21:
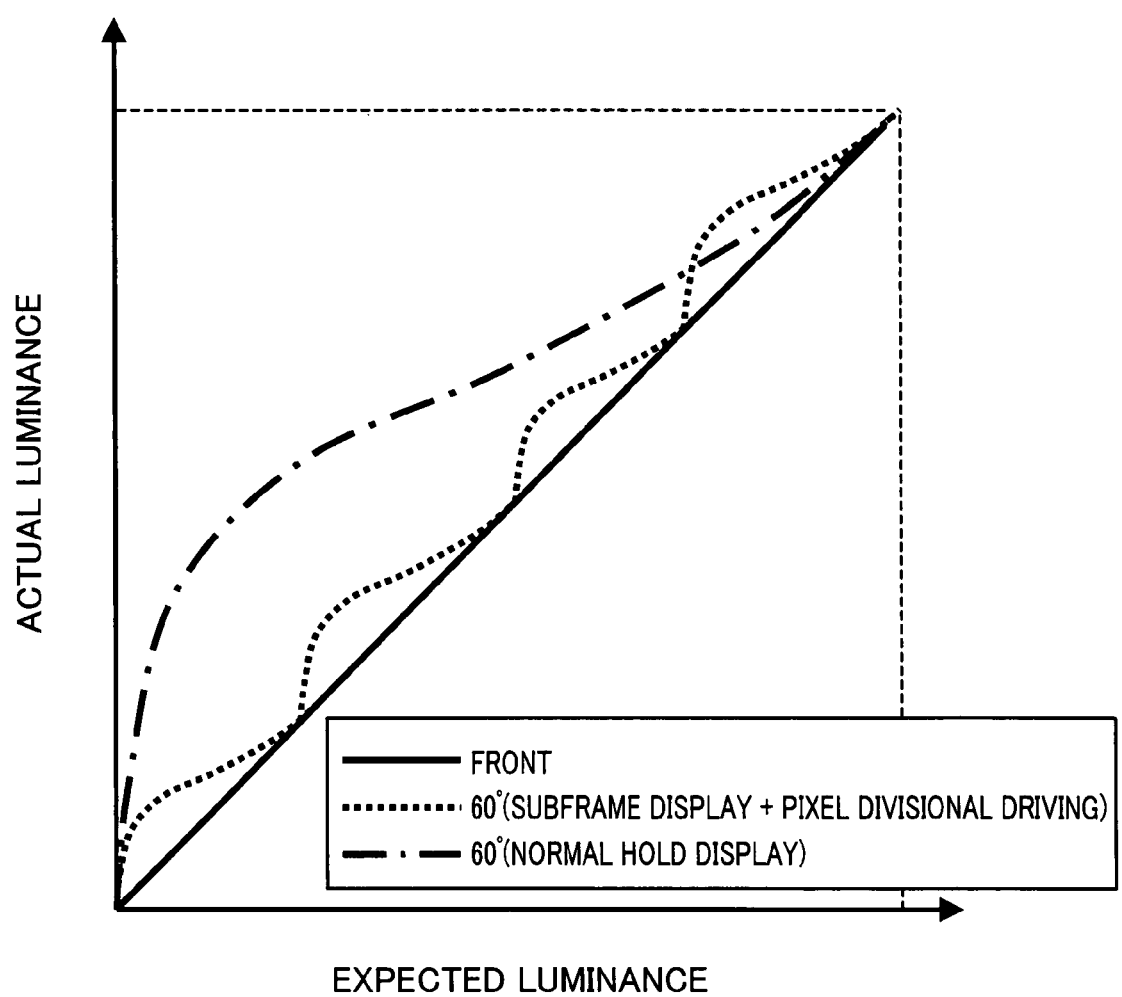
FIG. 21 A graph representing results of displays produced by a combination of a subframe display, a polarity reversion driving, and a pixel divisional driving scheme (broken line and solid line) and results of ordinary hold display (dash-dot line and solid line).

FIG. 21 is a graph representing results of displays produced by the above combination of the subframe display, the polarity reversion driving, and the pixel divisional driving (broken line and solid line) and results of ordinary hold display (dash-dot line and solid line; similar to the results shown in FIG. 2) on the present display device. As can be seen from the graph, the combination of the subframe display and the pixel divisional driving brings the actual luminance very close to the expected luminance at a viewing angle of 60°. It would be understood that the synergistic effects of the subframe display and the pixel divisional driving impart extremely good viewing angle characteristics.

In the foregoing, the state of the auxiliary signal (phase immediately after the drawing phenomenon; ↑, ↓) is inverted in phase with the polarity reversion at the frame cycle (cycle of one frame duration). This is however not the only possibility. The control section 15 may change the cycle or phase of the auxiliary signal state inversions and the polarity reversions.

Figure 18:
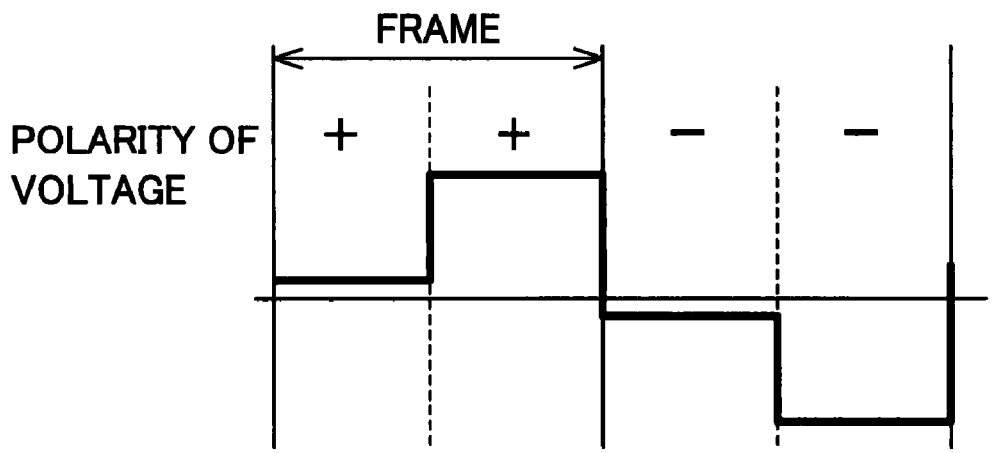
FIG. 18(a) A graph representing changes of a liquid crystal driving voltage (for one pixel) when subframe display is carried out with the polarity of the liquid crystal driving voltage being reversed from one frame to the next.
FIG. 18(b) A graph representing a liquid crystal driving voltage for a high luminance subpixel (bright pixel) in a pixel divisional driving scheme.
FIG. 18(c) A graph representing a liquid crystal driving voltage for a low luminance subpixel (dark pixel) in the same pixel divisional driving scheme.
Figure 18:
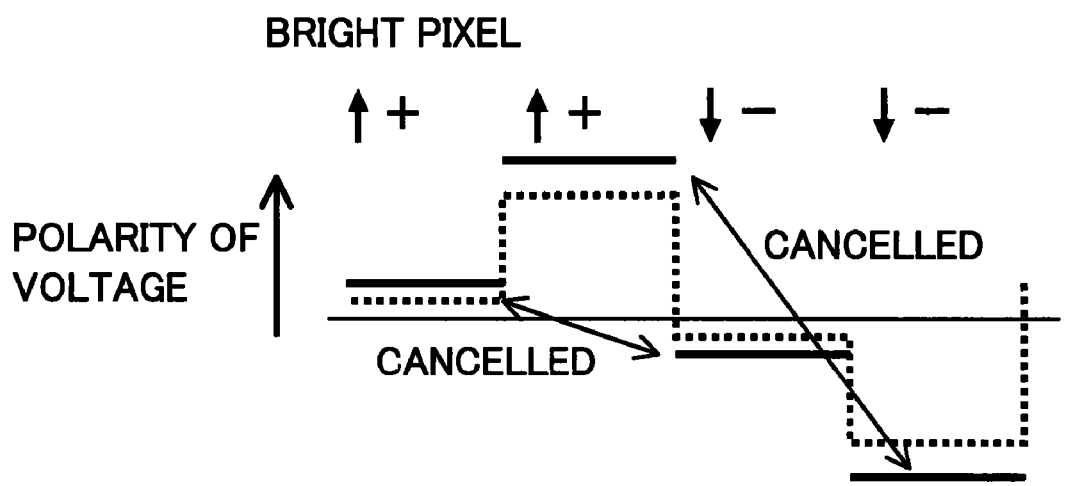
Figure 18:
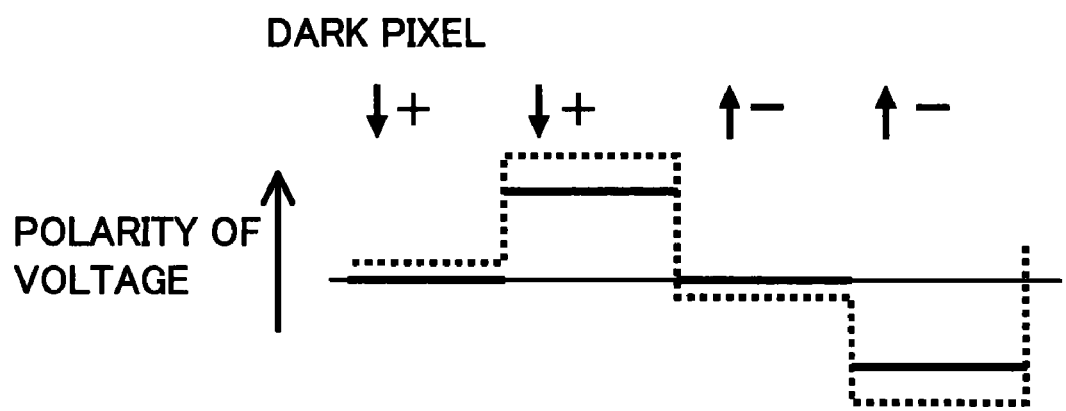
Figure 19:
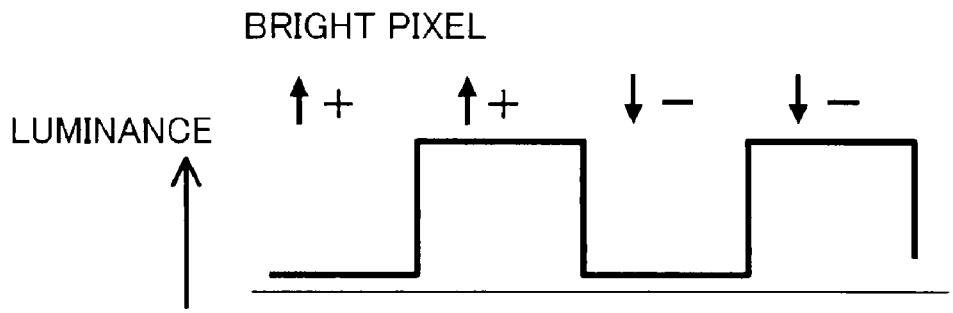
FIG. 19(a) A graph, corresponding to FIG. 18(b), which represents the luminance of a bright pixel and a dark pixel.
FIG. 19(b) A graph, corresponding to FIG. 18(c), which represents the luminance of a bright pixel and a dark pixel.
Figure 19:
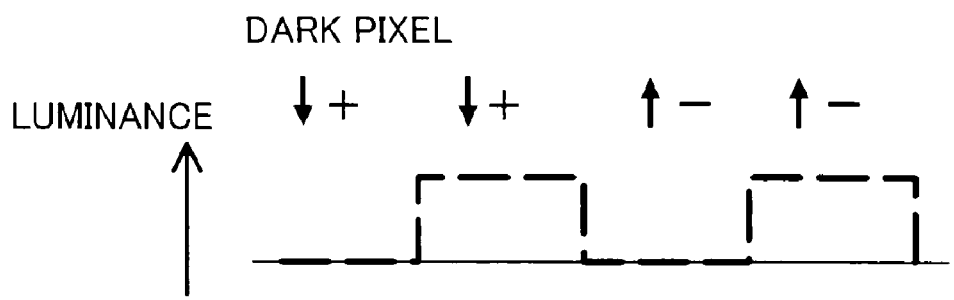
Figure 22:
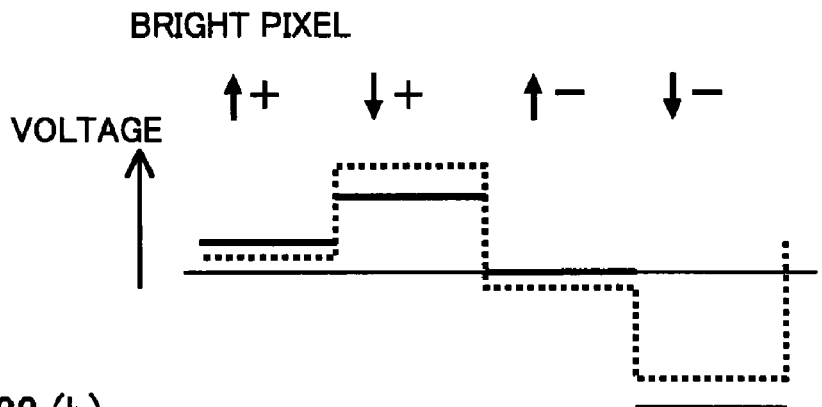
FIG. 22(a) A graph representing the luminance of subpixels when both the polarity reversions of a liquid crystal driving voltage and the state inversions of an auxiliary signal take place at a subframe cycle.
FIG. 22(b) A graph representing the luminance of subpixels when both the polarity reversions of a liquid crystal driving voltage and the state inversions of an auxiliary signal take place at a subframe cycle.
Figure 22:
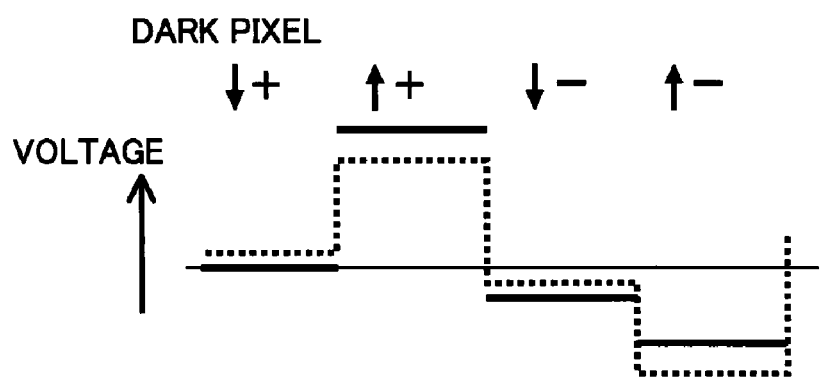
Figure 23:
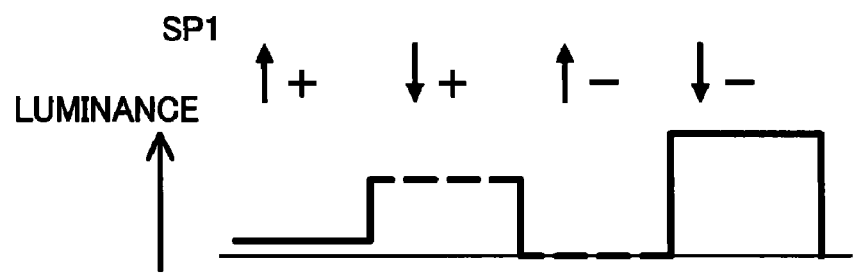
FIG. 23(a) A graph, corresponding to FIG. 22(a), which represents the luminance of subpixels.
FIG. 23(b) A graph, corresponding to FIG. 22(b), which represents the luminance of subpixels.
Figure 23:
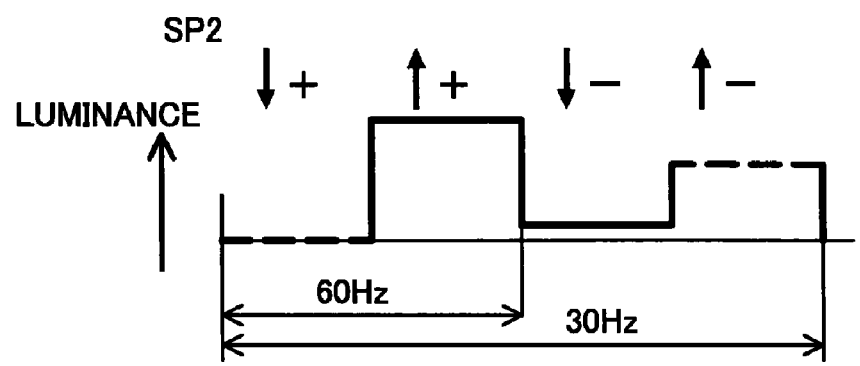

For example, FIGS. 22(*a*) and 22(*b*) are graphs representing the liquid crystal driving voltages applied to the subpixels SP1, SP2 when the state of the auxiliary signal is inverted at the subframe cycle for the subframe display whereby the polarity of the liquid crystal driving voltages are reversed from one frame to the other (see FIG. 18(*a*)). FIGS. 23(*a*) and 23(*b*), corresponding to FIGS. 22(*a*) and 22(*b*), are graphs representing the luminance of the subpixels SP1, SP2.

As depicted in these figures, In a case like this, in the subpixel SP1, the liquid crystal driving voltage in the succeeding subframe decreases, whereas the liquid crystal driving voltage in the preceding subframe increases. In the subpixel SP2, the liquid crystal driving voltage in the succeeding subframe increases, whereas the liquid crystal driving voltage in the preceding subframe decreases. Therefore, the scheme again renders almost 0 V the total liquid crystal driving voltage over the two frames. Thus, the scheme cancels the DC component of the liquid crystal driving voltage to such a degree that its remains would not cause any problems.

Figure 24:
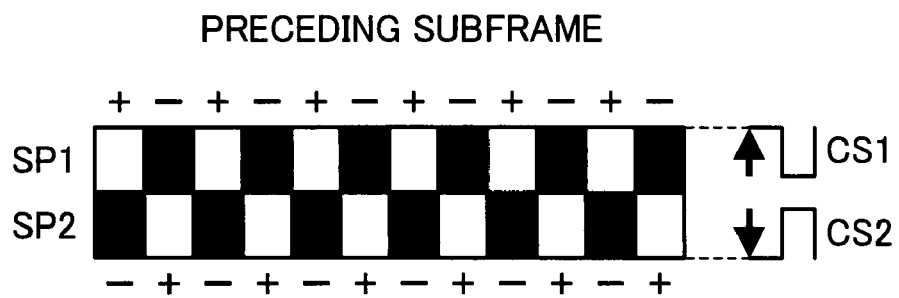
FIG. 24(a) An illustration of the display states of subpixels in a liquid crystal panel when the state inversions of an auxiliary signal take place in phase with the polarity reversions of a liquid crystal driving voltage and at a subframe cycle as in FIGS. 18(a) and 18(b).
FIG. 24(b) An illustration of the display states of subpixels in a liquid crystal panel when the state inversions of an auxiliary signal take place in phase with the polarity reversions of a liquid crystal driving voltage and at a subframe cycle as in FIGS. 18(a) and 18(b).
FIG. 24(c) An illustration of the display states of subpixels in a liquid crystal panel when the state inversions of an auxiliary signal take place in phase with the polarity reversions of a liquid crystal driving voltage and at a subframe cycle as in FIGS. 18(a) and 18(b).
Figure 24:
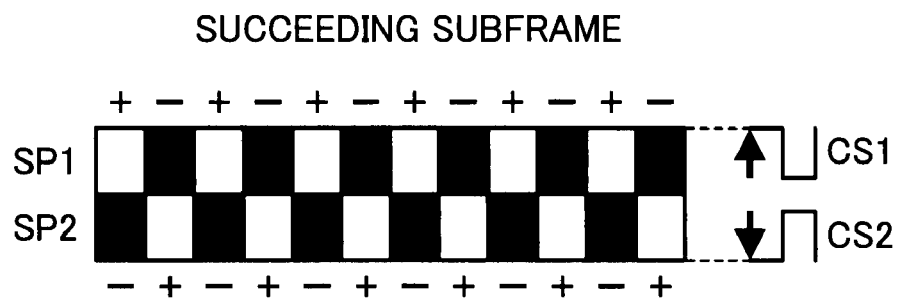
Figure 24:
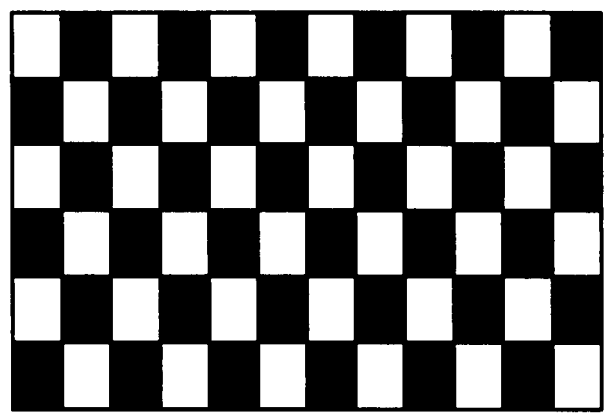

The scheme has following advantages. FIGS. 24(*a*) to 24(*c*) are illustrations of the display states of the subpixels SP1, SP2 in the liquid crystal panel 21 when the state inversions of the auxiliary signal take place in phase with the polarity reversions of the liquid crystal driving voltage and at the subframe cycle (the cases shown in FIGS. 18(*a*) and 18(*b*)).

In these figures, bright pixels appear white, and dark pixels appear black. FIG. 24(*a*) is an illustration of the display states of a line of pixels (a part of the line) in the preceding subframe. FIG. 24(*b*) is a similar illustration of the display states of a line of pixels, but in the succeeding subframe. FIG. 24(*c*) is an illustration of the display states of three lines of pixels in either of the subframes.

As shown in FIGS. 24(*a*) and 24(*b*), in this case, each of the subpixels SP1, SP2 is kept either bright or dark. The role of each subpixel remains unchanged over different subframes (a bright pixel is always bright, never turning dark).

Therefore, bright pixels and dark pixels alternate in both vertical and horizontal directions in the liquid crystal panel, as shown in FIG. 24(*c*), while the same image is being displayed.

For these reasons, a uniform color image display could be perceived by the user as a screened pattern of bright dots and dark dots (appears like a spotty image to the user).

In contrast, as shown in FIGS. 23(*a*) and 23(*b*), when the polarity of the liquid crystal driving voltage is reversed from one frame to the next, whereas the state of the auxiliary signal is inverted at the subframe cycle, the subpixels SP1, SP2 switch their roles as a bright pixel and a dark pixel (exchange brightness/darkness; the relationship between the levels of the luminance of one of the subpixels and the luminance of the other subpixel is not always invariable, but changed) at the frame cycle. Furthermore, In a case like this, a brightness/darkness exchange can take place in a frame.

According to the scheme, each subpixel SP1, SP2 singly achieves the target display luminance in two frames (the display luminance achieved by the two subpixels in one frame in the scheme illustrated in FIGS. 18(*a*) and 18(*b*)). Therefore, the subpixels SP1, SP2 output display light of substantially the same luminance (in FIGS. 23(*a*) and 23(*b*), solid lines indicate durations of bright pixels, and broken lines indicate durations of dark pixels). Consequently, the resultant display appears less spotty to the user with the scheme than with a scheme in which each of the two subpixels SP1, SP2 is kept either bright or dark.

Figure 25:
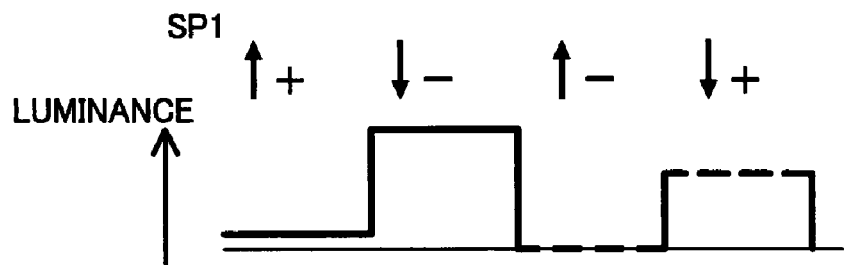
FIG. 25(a) A graph representing the luminance of subpixels when the polarity of a liquid crystal driving voltage is reversed between the two subframes in each frame and maintained over a succeeding subframe and a preceding subframe of the immediately following frame, and the state of an auxiliary signal is inverted at a subframe cycle.
FIG. 25(b) A graph representing the luminance of subpixels when the polarity of a liquid crystal driving voltage is reversed between the two subframes in each frame and maintained over a succeeding subframe and a preceding subframe of the immediately following frame, and the state of an auxiliary signal is inverted at a subframe cycle.
Figure 25:
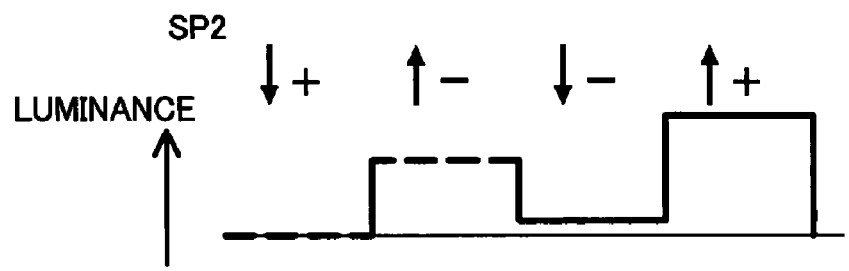

The foregoing description gives an example of the cycles of the state inversions of the auxiliary signal and the polarity reversions, in which the polarity of the liquid crystal driving voltage is reversed from frame to frame to implement the subframe display, and the state of the auxiliary signal is inverted at the subframe cycle. This is however not the only possibility. As shown in FIGS. 25(*a*) and 25(*b*), the polarity of the liquid crystal driving voltage may reversed between the two subframes in each frame and maintained over each succeeding subframe and the preceding subframe of the immediately following frame (see FIG. 19(*b*)), and the state of the auxiliary signal is inverted at the subframe cycle. The scheme produces similar effects.

In other words, the scheme keeps the subpixels SP1, SP2 either bright or dark in each frame. However, since the subpixels SP1, SP2 switch their roles from frame to frame, the subpixels SP1, SP2 output display light with substantially the same luminance over two frames. Therefore, the scheme reduces the spotty appearance.

Reversing the polarity of the liquid crystal driving voltage at the frame cycle and inverting the state of the auxiliary signal at the subframe cycle in this manner enables the subpixels SP1, SP2 to switch their roles (either bright or dark) at the frame cycle (or from frame to frame). Therefore, with the scheme, each subpixel SP1, SP2 singly achieves the target display luminance in two frames (the display luminance achieved by the two subpixels in one frame in the scheme illustrated in FIGS. 18(*a*) and 18(*b*)). Thus, the scheme reduces the spotty appearance.

In the present embodiment, the ratio of the preceding subframe period and the succeeding subframe period (frame division ratio) is preferably set in a range from 3:1 to 7:1. This is however not the only possibility. The frame division ratio may be set in a range from 1:1 or 2:1.

For example, if the frame division ratio is set to 1:1, as shown in FIG. 3, the actual luminance can be brought closer to the expected luminance than in ordinary hold display. In addition, as shown in FIG. 6, the same is true with brightness; the actual brightness can be brought closer to the expected brightness than in ordinary hold display. Therefore, in a case like this, it is clear that viewing angle characteristics can again improve over ordinary hold display.

The liquid crystal panel 21 needs a time in accordance with the response rate of the liquid crystal to render the liquid crystal driving voltage (voltage applied to the liquid crystal; electrode-to-electrode voltage) have a value in accordance with the display signal. Therefore, if one of the subframe periods is too short, the voltage across the liquid crystal can possibly not raised to a value that is in accordance with the display signal within this period.

Setting the ratio between the preceding subframe and the succeeding subframe period to 1:1 or 2:1 prevents one of the two subframe periods from becoming too short. Therefore, suitable display can be carried out even when using a slow-response liquid crystal.

The frame division ratio (ratio of the preceding subframe and the succeeding subframe) may be set to n:1 (n is a natural number greater than or equal to 7). Alternatively, the frame division ratio may be set to n:1 (n is a real number greater than or equal to 1, preferably a real number greater than 1). Setting the frame division ratio to, for example, 1.5:1 improves the viewing angle characteristics over the 1:1 setting and makes it easier to use the slow-response liquid crystal material than the 2:1 setting.

Even in cases where the frame division ratio is set to n:1 (n is a real number greater than or equal to 1), to display an image with low luminance (low brightness), no brighter than 1/(n+1) times the maximum luminance (=Tmax/(n+1)), preferably, only the succeeding subframe is used to produce the display, with the preceding subframe being designated for black display.

In addition, to display an image with high luminance (high brightness), Tmax/(n+1) or brighter, preferably, the luminance in only the preceding subframe is adjusted to produce a display, with the succeeding subframe being designated for white display. Accordingly, one subframe is always in such a state that there is no difference between the actual luminance and the expected luminance. Therefore, the present display device has good viewing angle characteristics. If the frame division ratio is n:1, substantially the same effects are expected no matter which one of the preceding and succeeding frames is set to n. In other words, n:1 and 1:n are identical with respect to viewing angle improving effects. In addition, n, when it is a real number greater than or equal to 1, is effective in the control of the luminance grayscale levels using equations (10) to (12) shown above.

In the present embodiment, the subframe display implemented by the present display device is a display produced by dividing the frame into two subframes. This is however not the only possibility. The present display device may be designed to carry out subframe display in which the frame is divided into three or more subframes.

In the subframe display in which a frame divided into m pieces, in a very low luminance case, the m−1 subframes are designated for black display, whilst the luminance (luminance grayscale level) of only one subframe is adjusted to produce a display. This subframe is designated for white display when the luminance becomes so high that this subframe alone cannot deliver the required luminance. The m−2 subframes are then designated for black display, whilst the luminance in the remaining one subframe is adjusted to produce a display.

In other words, even when the frame is divided into m pieces, preferably, there is always one and only one subframe of which the luminance is adjusted (changed) similarly to the case where the frame is divided into two pieces, whilst the other subframes are designated for either white display or black display. Accordingly, the m−1 subframes can be designated for a state in which there is no discrepancy between the actual luminance and the expected luminance. Therefore, the present display device has good viewing angle characteristics.

Figure 26:
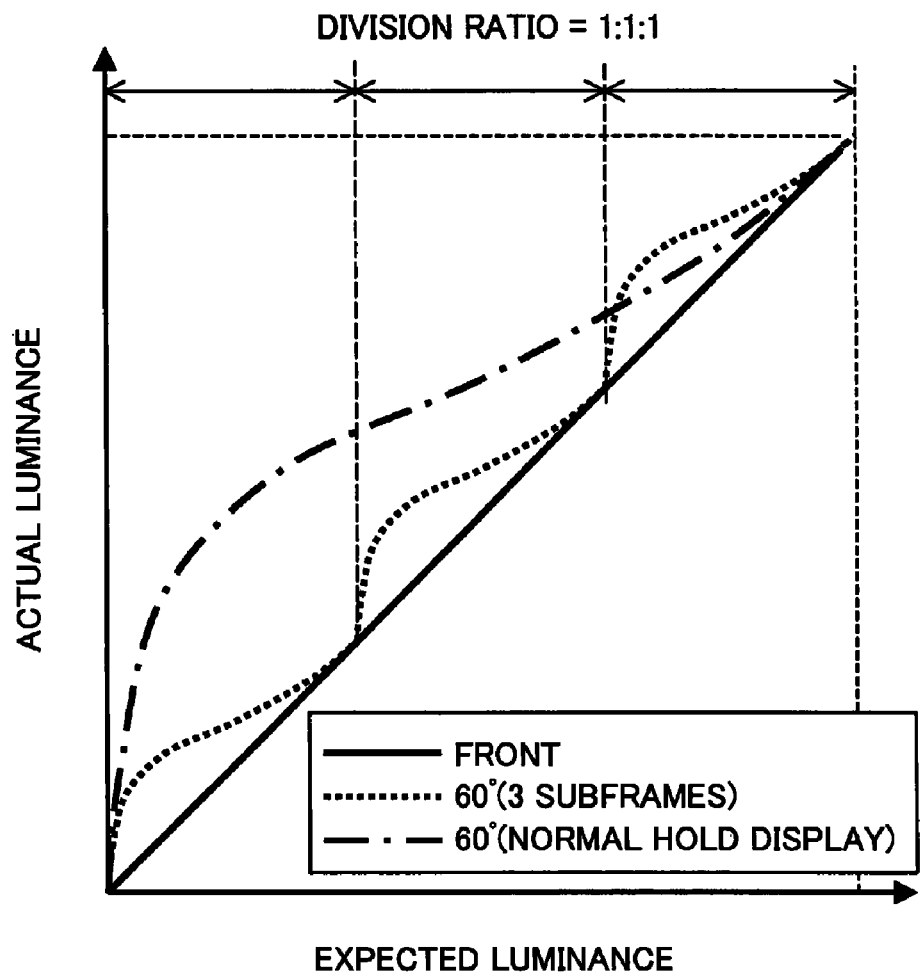
FIG. 26 A graph representing results of displays produced by dividing a frame equally into three subframes (broken line and solid line) and results of ordinary hold display (dash-dot line and solid line).

FIG. 26 is a graph representing results of displays produced on the present display device by dividing the frame equally into three subframes (broken line and solid line) as well as results of ordinary hold display (dash-dot line and solid line; similar to the results shown in FIG. 2. As can be seen from the graph, increasing the number of subframes to three moves the actual luminance closer to the expected luminance. Therefore, the present display device has further improved viewing angle characteristics.

Figure 27:
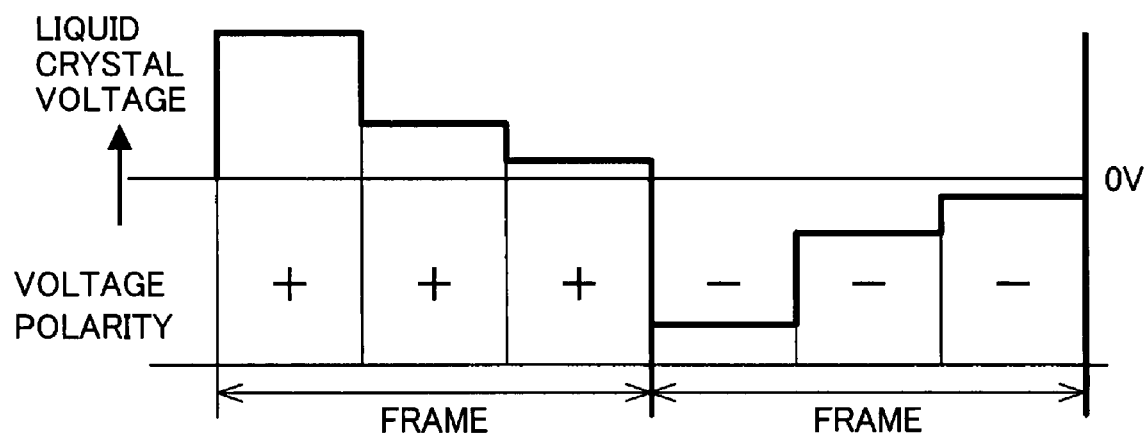
FIG. 27 A graph representing transitioning of a liquid crystal driving voltage when each frame is divided into three subframes and the voltage polarity is reversed from one frame to the next.

Even when the frame is divided into m pieces, the aforementioned polarity reversion driving is preferably carried out. FIG. 27 is a graph representing transitioning of a liquid crystal driving voltage when the frame is divided into three subframes and the voltage polarity is reversed for each frame.

As shown in the figure, in a case like this, the total liquid crystal driving voltage over the two frames can again be rendered 0 V.

Figure 28:
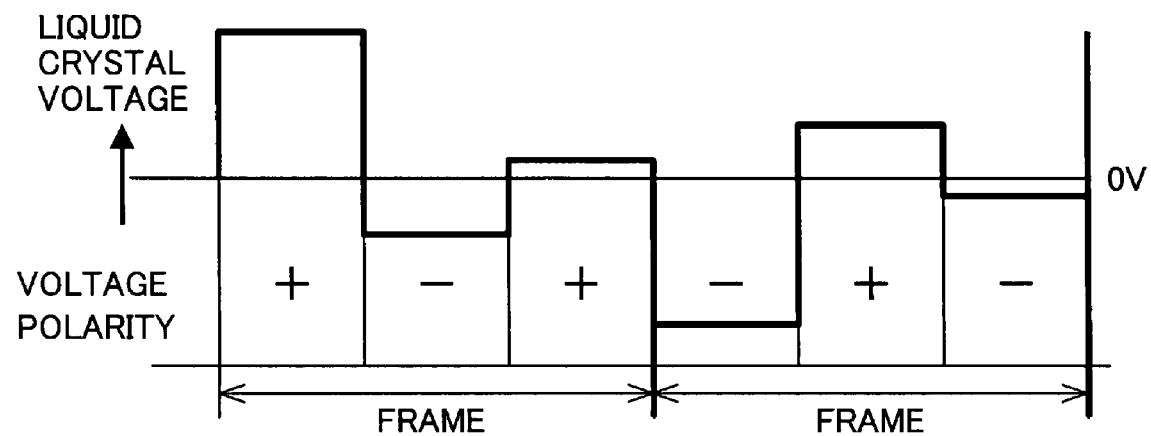
FIG. 28 A graph representing transitioning of a liquid crystal driving voltage when each frame is divided into three subframes and the voltage polarity is reversed from one subframe to the next.

FIG. 28 is a graph representing transitioning of a liquid crystal driving voltage when the frame is similarly divided into three subframes and the voltage polarity is reversed for each subframe. When the frame is divided into an odd number of pieces in this manner, even if the voltage polarity is reversed for each subframe, the total liquid crystal driving voltage over the two frames can be rendered 0 V.

Therefore, when the frame is divided into m pieces (m is an integer greater than or equal to 2), liquid crystal driving voltage of different polarity is preferably applied in the m-th (M; 1 to m) subframes of adjoining frames under the control of the control section 15. Accordingly, the total liquid crystal driving voltage over the two frames can be rendered 0 V.

When the frame is divided into m pieces (m is an integer greater than or equal to 2), the polarity of the liquid crystal driving voltage is preferably reversed so that the total liquid crystal driving voltage over two (or more) frames becomes 0 V.

When each frame is divided into m subframes (m is 3 or a greater integer), the subpixels SP1, SP2 can again switch their roles (either bright or dark) at the frame cycle (or from frame to frame) by changing the phase of the polarity reversions of the liquid crystal driving voltage and the phase of the state inversions of the auxiliary signal as shown in FIGS. 23(*a*), 23(*b*), 25(*a*), and 25(*b*).

Figure 29:
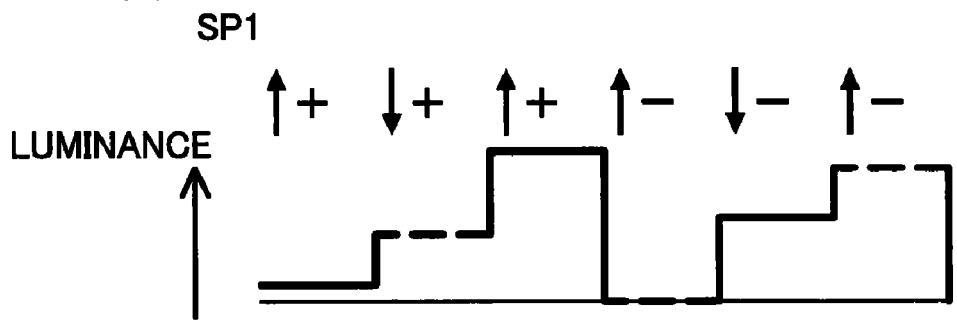
FIG. 29(a) A graph representing transitioning of the luminance of subpixels when a frame is divided into three subframes, the voltage polarity is reversed for each frame, and the state of an auxiliary signal is inverted from one subframe to the next of the three subframes in each frame and maintained over the third (last) subframe of each frame and the first (initial) subframe of the immediately following frame.
FIG. 29(b) A graph representing transitioning of the luminance of subpixels when a frame is divided into three subframes, the voltage polarity is reversed for each frame, and the state of an auxiliary signal is inverted from one subframe to the next of the three subframes in each frame and maintained over the third (last) subframe of each frame and the first (initial) subframe of the immediately following frame.
Figure 29:
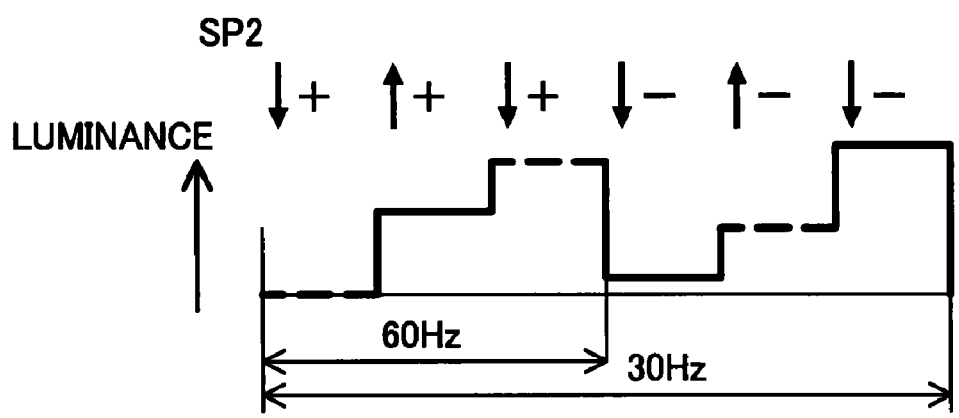

For example, FIGS. 29(*a*) and 29(*b*) are graphs representing the transitioning of the luminance of the subpixels SP1, SP2 when a frame is divided into three subframes, the voltage polarity is reversed for each frame, and the state of the auxiliary signal is inverted from one subframe to the next of the three subframes in each frame and maintained over the third (last) subframe of each frame and the first (initial) subframe of the immediately following frame.

Figure 30:
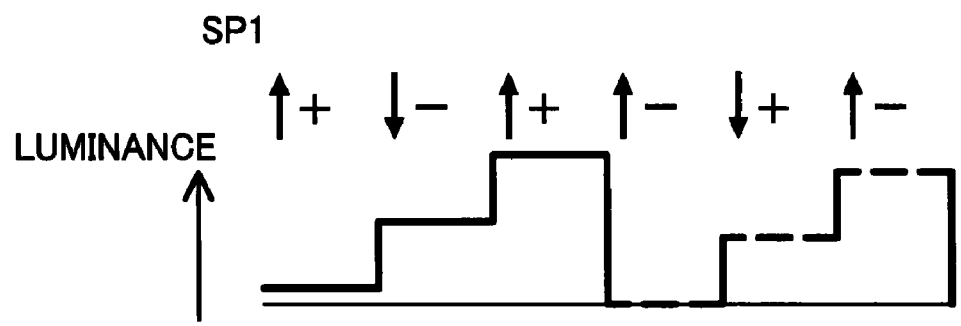
FIG. 30(a) A graph representing transitioning of the luminance of subpixels when a frame is divided into three subframes, the voltage polarity is reversed for each subframe, and the state of an auxiliary signal is inverted from one subframe to the next of the three subframes in each frame and maintained over the third (last) subframe of each frame and the first (initial) subframe of the immediately following frame.
FIG. 30(b) A graph representing transitioning of the luminance of subpixels when a frame is divided into three subframes, the voltage polarity is reversed for each subframe, and the state of an auxiliary signal is inverted from one subframe to the next of the three subframes in each frame and maintained over the third (last) subframe of each frame and the first (initial) subframe of the immediately following frame.
Figure 30:
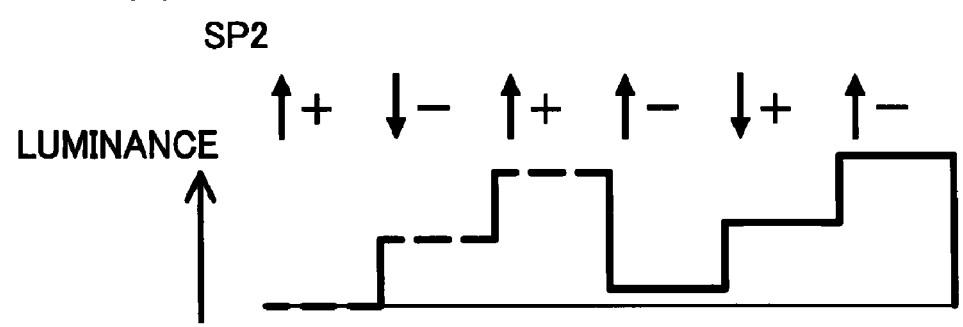

FIGS. 30(*a*) and 30(*b*) are graphs representing the transitioning of the luminance of the subpixels SP1, SP2 when a frame is divided into three subframes, the voltage polarity is reversed for each subframe, and the state of the auxiliary signal is inverted from one subframe to the next of the three subframes in each frame and maintained over the third (last) subframe of each frame and the first (initial) subframe of the immediately following frame.

As depicted in these figures, with the scheme, the subpixels SP1, SP2 can again switch their roles (either bright or dark) in one or two frames. Therefore, with the scheme, each subpixel SP1, SP2 singly achieves the target display luminance in two frames (the display luminance achieved by the two subpixels in one frame in the scheme illustrated in FIGS. 18(*a*) and 18(*b*)). Thus, the scheme reduces the spotty appearance.

Following problems could occur with the schemes shown in FIGS. 23(*a*), 23(*b*), 25(*a*), 25(*b*), 29(*a*), 29(*b*), 30(*a*), and 30(*b*) whereby the subpixels SP1, SP2 switch their roles (either (bright or dark) in one frame (or at the frame cycle). As shown in FIGS. 23(*b*) and 29(*b*), if the frame frequency is set to 60 Hz, since luminance differs from one frame to the other, the luminance of the subpixels SP1, SP2 changes at a frequency of 30 Hz. Thus, the scheme may possibly entail flickering.

The scheme shown in FIGS. 29(*a*) and 29(*b*) is far better than that shown in FIGS. 30(*a*) and 30(*b*) as far as the flickering is concerned. Specifically, with the former, the subpixels SP1, SP2 switch their roles (either bright or dark) in one frame. Meanwhile, with the latter, each of the subpixels SP1, SP2 is kept either bright or dark in single frames.

Therefore, the former reduces luminance difference between frames for the subpixels SP1, SP2 than the latter. Thus, flicker occurrences could be reduced.

When each frame is divided into m subframes (m is 3 or a greater integer), the subpixels SP1, SP2 preferably switch their roles (either bright or dark) in one frame for reduced flickering.

When each frame is divided into an even number of subframes (m defined above is an even number), the present display device preferably reverses the polarity of the liquid crystal driving voltage at the frame cycle and inverts the state of the auxiliary signal supplied to the subpixels SP1, SP2 at the subframe cycle. The reversions and inversions enable the subpixels SP1, SP2 to switch their roles (either bright or dark) at the frame cycle.

When there are produced an odd number of subframes (each frame is divided into an odd number of subframes), the total liquid crystal driving voltage over two frames can be rendered 0 V even if the polarity of the voltage is reversed for each subframe.

The control section 15 preferably inverts the state of the auxiliary signal supplied to the subpixels SP1, SP2 from one subframe to the next in each frame and maintains the state over the last subframe of each frame and the first subframe of the immediately following frame. The inversions enable the subpixels SP1, SP2 to switch their roles (either bright or dark) at the frame cycle.

In the foregoing description, the subpixels SP1, SP2 switch their roles (either bright or dark) at the frame cycle by inverting the state of the auxiliary signal at the subframe cycle.

However, the spotty appearance is reduced by avoiding keeping the subpixels either bright or dark.

Therefore, the spotty appearance is reduced simply by reversing the polarity of the display signal voltage at the frame cycle and inverting the state of the auxiliary signal supplied to the subpixels in one frame.

The subpixels SP1, SP2 may switch their roles (either bright or dark) at a cycle other than the frame cycle or further alternatively at no fixed cycle, i.e., at random.

As mentioned earlier, when the frame is divided into m pieces, preferably, there is always one and only one subframe of which the luminance is adjusted, whilst the other subframes are designated for either white display (maximum luminance) or black display (minimum luminance). This is however not the only possibility. There may be two or more subframes in which the luminance is adjusted. In a case like this, viewing angle characteristics are again improved by designating at least one subframe for white display (maximum luminance) or black display (minimum luminance).

The luminance in the subframes in which luminance is not adjusted may be set to, instead of a maximum luminance, a maximum or a value greater than a second predetermined value. That luminance may be set to, instead of a minimum luminance, a minimum or a value less than a first predetermined value.

In a case like this, the discrepancy between the actual brightness and the expected brightness (brightness discrepancy) in the subframes in which luminance is not adjusted can again be reduced sufficiently. Therefore, the present display device has improved viewing angle characteristics.

Figure 31:
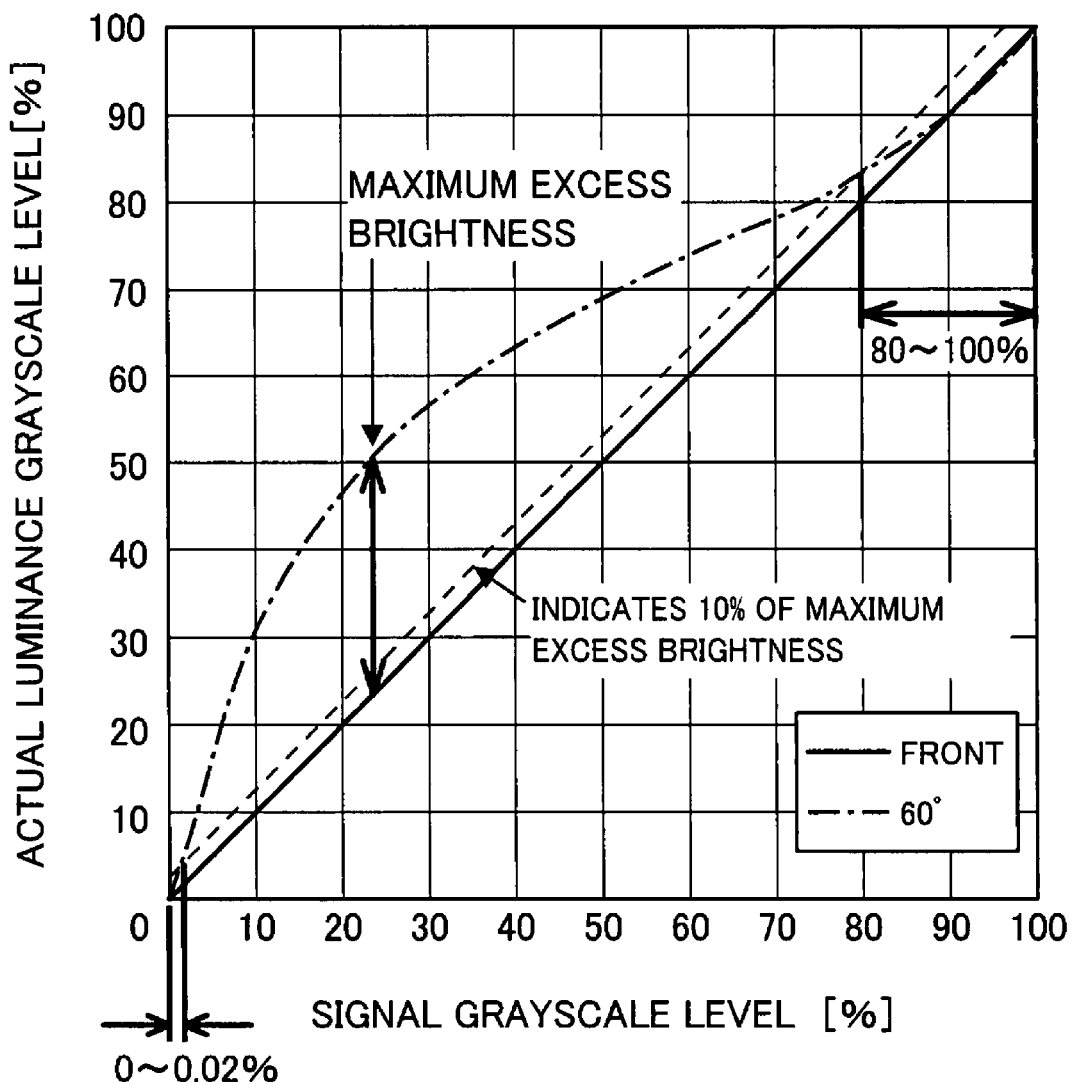
FIG. 31 A graph representing, for a subframe in which luminance is not adjusted, relationship (viewing angle grayscale characteristics (actual measurements)) between the signal grayscale level (%; luminance grayscale level represented by a display signal) output supplied to a display section and the actual luminance grayscale level (%) in accordance with that signal grayscale level.

FIG. 31 is a graph representing a relationship (viewing angle grayscale characteristics (actual measurements)) in the subframes in which luminance is not adjusted between a signal grayscale level output (%; luminance grayscale level represented by a display signal) on the display section 14 and the actual luminance grayscale level (%) in accordance with that signal grayscale level.

The "actual luminance grayscale level" refers to a result of conversion into a luminance grayscale level using equation 1 of a luminance output (actual luminance) on the liquid crystal panel 21 in the display section 14 in accordance with a signal grayscale level. As can be seen from the graph, the aforementioned two grayscale levels are equal when the liquid crystal panel 21 is viewed from the front (that is, viewing angle=0°. In contrast, when the viewing angle is 60°, the actual luminance grayscale level appears brighter than signal grayscale level at halftone due to excess brightness. The excess brightness is a maximum when the luminance grayscale level is 20% to 30%, irrespective of viewing angle.

It is known that so long as the excess brightness does not exceed 10% of the maximum value indicated by the broken line in the graph, the present display device is capable of sustaining sufficiently display quality (keeping the aforementioned brightness discrepancy sufficiently small). The excess brightness stays within 10% of the maximum value when the signal grayscale level is in the ranges of 80 to 100% and 0 to 0.02% of its maximum value. These ranges are invariable with respect to the viewing angle.

Therefore, the second predetermined value is preferably set to 80% of the maximum luminance. The first predetermined value is preferably set to 0.02% of the maximum luminance.

In addition, there is no need to provide subframes in which luminance is not adjusted. In other words, when a display is to be produced using m subframes, there is no need to create different display states for the subframes. This configuration is still capable of the polarity reversion driving explained above whereby the polarity of the liquid crystal driving voltage is reversed at the frame cycle.

When a display is to be produced using m subframes, creating a slight difference between the display states of the subframes can improve the viewing angle characteristics of the liquid crystal panel 21.

The present invention could be described as follows. It is a display device designed to display an image by dividing each frame into m subframes (m is an integer greater than or equal to 2) and include a liquid crystal display section and a control section. The liquid crystal display section displays an image with luminance in accordance with an incoming display signal voltage. The control section generates first to m-th display signals for the first to m-th subframes for output to the liquid crystal display section and reverses the polarity of the display signal voltage at the frame cycle so that the dividing of the frames does not change a sum luminance output of the display section in each frame. The liquid crystal display section has pixels each containing a first subpixel and a second subpixel which are connected to the same source line and the same gate line and change luminance in accordance with the display signal voltage. The control section designates one of the first and second subpixels as a bright pixel and the other as a dark pixel for at least one display signal voltage and alternately designates the subpixels as the bright pixel at a predetermined cycle.

Alternatively, the liquid crystal television receiver of the present invention may be a display device structured to display an image by dividing each frame into m subframes (m is an integer greater than or equal to 2) and include a display section and a control section. The display section is provided by a liquid crystal display element and displays an image with luminance in accordance with a display signal voltage. The control section generates first to m-th display signals for the first to m-th subframes for output to the display section so that the dividing of the frames does not change a sum luminance output of the display section in each frame. The display section has pixels each containing a first subpixel and a second subpixel which are connected to the same source line and the same gate line. The liquid crystal television receiver further includes the display device and a tuner section. The display device is adapted so that the control section creates a difference between the luminance of the first subpixel and the luminance of the second subpixel and does not always maintain an invariable relationship between the levels of the luminance of one of the subpixels and the luminance of the other subpixel, but changes the relationship. The tuner section selects a channel for television broadcast signals and transfers the selected channel's television image signals to the control section. The control section in the display device generates the display signals from the television image signals.

In the description so far, all processing in the present display device is done under the control of the control section 15. This is however not the only possibility. Computer programs for the implementation of the processing may be stored in a storage medium, and an information processing device capable of reading the programs may replace the control section 15.

In the structure, a computing device (CPU, MPU, etc.) in the information processing device reads the programs from the storage medium and executes the processing. In other words, the programs per se realize the processing.

The information processing device may be, apart from a general computer (workstation, personal computer, etc.), an extension board or an extension unit attached to a computer.

The computer program is software program code (executable program, intermediate code program, source program, etc.) which implements the processing. The program may be used alone or in combination with another program (e.g., OS). The program may be read from a storage medium, temporarily loaded into memory (e.g., RAM) in the device, and read again from the memory for execution.

The storage medium in which the program is stored may be readily separable from the information processing device or fixed (attached) to the device. Alternatively, the storage medium may be an external storage device connectable to the information processing device.

Examples of such a storage medium include magnetism tapes, such as video tapes and cassette tapes; magnetism disks, such as, Floppy® disks and hard disks; optical discs (magneto-optical discs), such as CDs, MOs, MDs, and DVDs; memory cards, such as IC cards and optical cards; and semiconductor memories, such as mask ROMs, EPROMs, EEPROMs, and flash ROMs.

The storage medium may be connected to the information processing device over a network (Intranet, Internet, etc.). In a case like this, the information processing device obtains the programs by downloading them over the network. In other words, the programs may be obtained over a transmission medium (which carries the program in a flowing manner) such as a network (either wired or wireless). A download program is preferably contained in the device (or transmission end device or receiving end device) in advance.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is suitable for applications to devices with a display screen in which an excess brightness phenomenon may occur.

The invention claimed is:

1. A display device for displaying an image, said display device comprising:
a display section, provided by a liquid crystal display (LCD), configured to display the image with a luminance in accordance with a display signal voltage, the display section including pixels, each pixel in the LCD including a first subpixel and a second subpixel that are connected to a same source line and same gate line; and
a control section configured to divide each frame into first to m-th subframe periods, m being an integer greater than or equal to two, the control section configured to generate first to m-th display signals for the first to m-th subframe periods for output to the display section such that dividing each frame into the first to m-th subframe periods does not change a sum luminance output of the display section within each frame;
wherein the control section creates a difference between a luminance of the first subpixel and a luminance of the second subpixel,
wherein each subpixel is connected to a different auxiliary line and includes a pixel capacitance, a switching element, and an auxiliary capacitance, the switching element applying, to the pixel capacitance, a display signal applied to the source line when the gate line turns ON, the auxiliary capacitance being connected to the pixel capacitance and a respective auxiliary line,
wherein the control section creates an auxiliary signal in a different state for each subpixel, the auxiliary signal being supplied to the first and second subpixels through the respective auxiliary lines, and adjusts a polarity of the display signal voltage to control a relationship between levels of the luminances of the first and second subpixels,
wherein the control section reverses the polarity of the display signal voltage at a frame cycle and inverts, in a frame, the state of the auxiliary signal supplied to each subpixel, and
wherein the control section inverts, at a subframe cycle, the state of the auxiliary signal supplied to each subpixel.

2. The display device of claim 1, wherein if m is 3 or greater, the control section reverses a relationship specified between levels of the luminances of the first and second subpixels in each frame.

3. A liquid crystal monitor, comprising:
the display device of claim 1; and
a signal feeder section for transferring externally supplied image signals to the control section, wherein the control section in the display device generates the display signals from the image signals.

4. A liquid crystal television receiver, comprising:
the display device of claim 1; and
a tuner section receiving television broadcast signals.

5. The display device of claim 1, wherein one of the m-th subframe periods has a luminance equal to a minimum luminance or a maximum luminance, and
wherein the control section designates one of the minimum luminance and the maximum luminance based on whether a luminance of the frame is above or below a threshold luminance for the frame.

6. The display device of claim 5, wherein when the luminance of the frame is below the threshold luminance, the control section designates the minimum luminance in one of the m-th subframe periods and adjusts a luminance in at least one other subframe period to achieve a grayscale display for the frame.

7. The display device of claim 5, wherein when the luminance of the frame is above the threshold luminance, the control section designates the maximum luminance in one of the m-th subframe periods and adjusts a luminance in at least one other subframe period to achieve a grayscale display for the frame.

8. A display device for displaying an image, said display device comprising:
- a display section, provided by a liquid crystal display (LCD), configured to display the image with a luminance in accordance with a display signal voltage, the display section including pixels, each pixel in the LCD including a first subpixel and a second subpixel that are connected to a same source line and same gate line; and
- a control section configured to divide each frame into first to m-th subframe periods, m being an integer greater than or equal to two, the control section configured to generate first to m-th display signals for the first to m-th subframe periods for output to the display section such that dividing each frame into the first to m-th subframe periods does not change a sum luminance output of the display section within each frame;
- wherein the control section creates a difference between a luminance of the first subpixel and a luminance of the second subpixel,
- wherein each subpixel is connected to a different auxiliary line and includes a pixel capacitance, a switching element, and an auxiliary capacitance, the switching element applying, to the pixel capacitance, a display signal applied to the source line when the gate line turns ON, the auxiliary capacitance being connected to the pixel capacitance and a respective auxiliary line,
- wherein the control section creates an auxiliary signal in a different state for each subpixel, the auxiliary signal being supplied to the first and second subpixels through the respective auxiliary lines, and adjusts a polarity of the display signal voltage to control a relationship between levels of the luminances of the first and second subpixels,
- wherein the control section reverses the polarity of the display signal voltage at a frame cycle and inverts, in a frame, the state of the auxiliary signal supplied to each subpixel, and
- wherein if m is an odd number, the control section inverts the state of the auxiliary signal supplied to each subpixel from one subframe period to a next subframe period in each frame and maintains the state over the m-th subframe period of each frame and the first subframe period of an immediately following frame.

9. A display device for displaying an image, said display device comprising:
- a display section, provided by a liquid crystal display (LCD), configured to display the image with a luminance in accordance with a display signal voltage, the display section including pixels, each pixel in the LCD including a first subpixel and a second subpixel that are connected to a same source line and same gate line; and
- a control section configured to divide each frame into first to m-th subframe periods, m being an integer greater than or equal to two, the control section configured to generate first to m-th display signals for the first to m-th subframe periods for output to the display section such that dividing each frame into the first to m-th subframe periods does not change a sum luminance output of the display section within each frame;
- wherein the control section creates a difference between a luminance of the first subpixel and a luminance of the second subpixel,
- wherein each subpixel is connected to a different auxiliary line and includes a pixel capacitance, a switching element, and an auxiliary capacitance, the switching element applying, to the pixel capacitance, a display signal applied to the source line when the gate line turns ON, the auxiliary capacitance being connected to the pixel capacitance and a respective auxiliary line,
- wherein the control section creates an auxiliary signal in a different state for each subpixel, the auxiliary signal being supplied to the first and second subpixels through the respective auxiliary lines, and adjusts a polarity of the display signal voltage to control a relationship between levels of the luminances of the first and second subpixels, and
- wherein if m is an odd number, the control section reverses the polarity of the display signal voltage at a subframe cycle, inverts the state of the auxiliary signal supplied to each subpixel from one subframe period to a next subframe period in each frame, and maintains the state over the m-th subframe period of each frame and the first subframe period of an immediately following frame.

* * * * *